(12) United States Patent
Yamamoto et al.

(10) Patent No.: US 10,569,657 B2
(45) Date of Patent: Feb. 25, 2020

(54) VEHICLE BRAKE SYSTEM

(71) Applicant: TOYOTA JIDOSHA KABUSHIKI KAISHA, Toyota-shi, Aichi-ken (JP)

(72) Inventors: Naoki Yamamoto, Okazaki (JP); Yu Takahashi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 59 days.

(21) Appl. No.: 15/382,060

(22) Filed: Dec. 16, 2016

(65) Prior Publication Data
US 2017/0232849 A1 Aug. 17, 2017

(30) Foreign Application Priority Data

Feb. 16, 2016 (JP) .................. 2016-026517
May 31, 2016 (JP) .................. 2016-108552
Jul. 28, 2016 (JP) .................. 2016-148414
Sep. 27, 2016 (JP) .................. 2016-188519

(51) Int. Cl.
*B60T 13/74* (2006.01)
*B60L 7/26* (2006.01)
*B60T 8/26* (2006.01)
*B60T 8/172* (2006.01)
*B60T 13/14* (2006.01)
*B60T 13/58* (2006.01)
(Continued)

(52) U.S. Cl.
CPC ............. *B60L 7/26* (2013.01); *B60T 8/172* (2013.01); *B60T 8/267* (2013.01); *B60T 13/142* (2013.01); *B60T 13/586* (2013.01); *B60T 8/348* (2013.01); *B60T 8/4081* (2013.01); *B60T 2210/30* (2013.01); *B60T 2270/604* (2013.01)

(58) Field of Classification Search
CPC ........ B60T 7/042; B60T 8/17; B60T 8/32654; B60T 8/3655; B60T 13/66; B60T 13/148; B60T 13/321; B60T 7/26; B60T 8/172
USPC ................ 303/3, 15, 20, 152, 155, 7
See application file for complete search history.

(56) References Cited

U.S. PATENT DOCUMENTS 5,615,933 A * 4/1997 Kidston .................. B60L 3/102
180/65.1
6,439,674 B1 8/2002 Niino
(Continued)

FOREIGN PATENT DOCUMENTS

DE 100 10 735 A1 1/2001
DE 10 2012 216590 A1 3/2014
(Continued)

OTHER PUBLICATIONS

May 4, 2018 Office Action issued in U.S. Appl. No. 15/381,934.

*Primary Examiner* — Christopher P Schwartz
(74) *Attorney, Agent, or Firm* — Oliff PLC

(57) ABSTRACT

A vehicle brake system, including: a brake operation member to be operated by a driver of a vehicle; a hydraulic brake device provided for one of a front wheel and a rear wheel and configured to generate a hydraulic braking force in accordance with an operation of the brake operation member, the hydraulic braking force depending on a pressure of a working fluid; and an electric brake device provided for the other of the front wheel and the rear wheel and configured to generate an electric braking force in accordance with the operation of the brake operation member, the electric braking force depending on a motion of an electric motor.

15 Claims, 20 Drawing Sheets

(51) Int. Cl.
  *B60T 8/34* (2006.01)
  *B60T 8/40* (2006.01)

(56) References Cited

U.S. PATENT DOCUMENTS

| | | | |
|---|---|---|---|
| 8,366,210 B2 | 2/2013 | Maki et al. | |
| 2004/0090116 A1* | 5/2004 | Tsunehara | B60K 6/48 303/152 |
| 2004/0108771 A1* | 6/2004 | Tsunehara | B60L 7/22 303/155 |
| 2005/0143878 A1* | 6/2005 | Park | B60K 6/48 701/22 |
| 2007/0114844 A1 | 5/2007 | Maki et al. | |
| 2007/0216222 A1* | 9/2007 | Miyazaki | B60T 8/172 303/155 |
| 2009/0069149 A1* | 3/2009 | Okumura | B60L 7/10 477/28 |
| 2010/0030444 A1 | 2/2010 | Roll et al. | |
| 2010/0198475 A1 | 8/2010 | Stolzl et al. | |
| 2011/0168502 A1 | 7/2011 | Linhoff et al. | |
| 2011/0210604 A1 | 9/2011 | Yamamoto et al. | |
| 2011/0313039 A1 | 12/2011 | Destaillats et al. | |
| 2013/0207451 A1* | 8/2013 | Ohkubo | B60T 8/3655 303/9.62 |
| 2013/0211684 A1* | 8/2013 | Baehrle-Miller | B60T 7/107 701/70 |
| 2014/0131150 A1 | 5/2014 | Nimura et al. | |
| 2015/0115697 A1* | 4/2015 | Yamamoto | B60T 7/042 303/3 |
| 2015/0197230 A1* | 7/2015 | Kolarsky | B60T 8/3265 701/70 |
| 2015/0203086 A1* | 7/2015 | Miyazaki | B60T 8/321 60/545 |

FOREIGN PATENT DOCUMENTS

| | | |
|---|---|---|
| EP | 1 428 738 A2 | 6/2004 |
| EP | 2481649 A1 | 8/2012 |
| JP | 2001-263395 A | 9/2001 |
| JP | 2002-067909 A | 3/2002 |
| JP | 2004-155390 A | 6/2004 |
| JP | 2004189056 | 7/2004 |
| JP | 2004-338582 A | 12/2004 |
| JP | 2007-137258 A | 6/2007 |
| JP | 2008-265397 A | 11/2008 |
| JP | 2012-519199 A | 8/2012 |
| JP | 5114575 B2 | 1/2013 |
| JP | 2014-136441 A | 7/2014 |
| JP | 2015-139293 A | 7/2015 |
| KR | 2015123358 A | 11/2015 |
| WO | 2011/036719 A1 | 3/2011 |
| WO | 2013/008298 A1 | 1/2013 |

* cited by examiner

ACTUATOR UNIT

HYDRAULIC BRAKING FORCE $F_{HY}$

ELECTRIC BRAKING FORCE $F_{EM}$

ELECTRIC BRAKING FORCE $F_{EM}$

TIME t

VEHICLE BRAKE SYSTEM

CROSS REFERENCE TO RELATED APPLICATION

The present application claims priority from Japanese Patent Application Nos. 2016-026517, 2016-108552, 2016-148414, and 2016-188519 which were respectively filed on Feb. 16, 2016, May 31, 2016, Jul. 28, 2016, and Sep. 27, 2016, the disclosure of which is herein incorporated by reference in its entirety.

BACKGROUND

Technical Field

The present disclosure relates to a brake system configured to brake a vehicle.

Description of Related Art

Many of conventional vehicle brake systems are constituted by a hydraulic brake device as disclosed in JP-A-2004-338582, for instance. Some vehicle brake systems are constituted by an electric brake device as disclosed in JP-A-2001-263395, for instance.

SUMMARY

The hydraulic brake device has the advantage of high reliability, and the electric brake device has the advantage of good response. These brake devices, however, have respective drawbacks. An aspect of the disclosure provides a vehicle brake system having high utility.

In one aspect of the disclosure, a vehicle brake system includes: a brake operation member to be operated by a driver of a vehicle; a hydraulic brake device provided for one of a front wheel and a rear wheel and configured to generate a hydraulic braking force in accordance with an operation of the brake operation member, the hydraulic braking force depending on a pressure of a working fluid; and an electric brake device provided for the other of the front wheel and the rear wheel and configured to generate an electric braking force in accordance with the operation of the brake operation member, the electric braking force depending on a motion of an electric motor.

According to the vehicle brake system constructed as described above, the hydraulic brake device and the electric brake device are provided for one and the other of the front wheel and the rear wheel. It is consequently possible to effectuate a practical brake system that makes use of advantages of the respective brake devices.

VARIOUS FORMS

There will be exemplified and explained various forms of the vehicle brake system that are considered claimable. Each of the forms is numbered like the appended claims and depends from the other form or forms, where appropriate. This is for easier understanding of the claimable vehicle brake system, and it is to be understood that combinations of constituent elements that constitute the vehicle brake system are not limited to those described in the following forms. That is, it is to be understood that the claimable vehicle brake system shall be construed in the light of the following description of various forms and embodiments. It is to be further understood that, as long as the claimable vehicle brake system is construed in this way, any form in which one or more constituent elements is/are added to or deleted from any one of the following forms may be considered as one form of the claimable vehicle brake system.

a. Basic Forms (1) A vehicle brake system, comprising:
a brake operation member to be operated by a driver of a vehicle;
a hydraulic brake device provided for one of a front wheel and a rear wheel and configured to generate a hydraulic braking force in accordance with an operation of the brake operation member, the hydraulic braking force depending on a pressure of a working fluid; and
an electric brake device provided for the other of the front wheel and the rear wheel and configured to generate an electric braking force in accordance with the operation of the brake operation member, the electric braking force depending on a motion of an electric motor.

This form is a basic form of the claimable vehicle brake system. According to this form, the brake devices of mutually different types are provided for one and the other of the front wheel and the rear wheel. It is thus possible to construct a brake system that makes use of advantages of the respective two brake devices, i.e., the hydraulic brake device and the electric brake device. Specifically, the hydraulic brake device has the advantage of high reliability, and the electric brake device has the advantage of good response. Thus, the vehicle brake system according to this form makes use of the advantages of the respective devices. Further, it is not required to provide the hydraulic brake device for both of the front wheel and the rear wheel, so that the hydraulic brake device is made compact in size and the vehicle brake system itself is accordingly made compact.

Preferable concrete structures of the hydraulic brake device will be explained in the following forms. The electric brake device may have any structure as long as the electric brake device is configured to apply, via a motion converting mechanism, a force generated by the electric motor as a force for stopping or decelerating rotation of the wheel while controlling the force.

It is not necessarily required that both of the hydraulic brake device and the electric brake device be configured to control the respective braking forces to be generated. In a hydraulic brake device including a master cylinder equipped with a negative-pressure booster, for instance, it is possible to obtain, without electronically controlling, the braking force in accordance with an operation force applied to the brake operation member. In an instance where such a hydraulic brake device is employed, the braking force generated by the electric brake device is mainly controlled. This form may be thus modified.

In this form, the hydraulic brake device may be provided for the front wheel while the electric brake device may be provided for the rear wheel, or the hydraulic brake device may be provided for the rear wheel while the electric brake device may be provided for the front wheel. In ordinary vehicles, the braking force given to the front wheel is made larger than the braking force given to the rear wheel. In view of this, the former is preferable, namely, it is preferable to provide, for the front wheel, the hydraulic brake device with high reliability. As later explained, in an instance where the vehicle brake system includes a regenerative brake device, determination as to which one of the front wheel and the rear wheel each of the hydraulic brake device and the electric brake device is provided for may be made depending upon which one of the front wheel and the rear wheel the regenerative brake device is provided for.

b. Cooperative Control of Hydraulic Braking Force and Electric Braking Force

The following forms relate to cooperative control of the hydraulic braking force and the electric braking force.

(11) The vehicle brake system according to the form (1), wherein the hydraulic braking force and the electric braking force are controlled so as to cooperate with each other.

By cooperation of the hydraulic braking force and the electric braking force, it is possible to construct a more practical vehicle brake system according to this form. Cooperation of the hydraulic braking force and the electric braking force is not limited to a particular configuration as long as each of the hydraulic braking force and the electric braking force functions as one component of a braking force to brake the vehicle (hereinafter referred to as "vehicle braking force" where appropriate) in a state in which relative adjustment of the hydraulic braking force and the electric braking force is maintained. For instance, one configuration of the cooperation of the hydraulic braking force and the electric braking force may include a configuration in which at least one of the hydraulic braking force and the electric braking force is controlled such that distribution of the braking force to the front wheel and the rear wheel becomes equal to set distribution, irrespective of whether a regenerative braking force (that will be explained) is to be generated or not. Concrete configurations of the cooperation will be explained in detail in the following forms.

(12) The vehicle brake system according to the form (11), wherein the hydraulic braking force and the electric braking force are generated at a set distribution ratio.

In this form, the configuration of the cooperation of the hydraulic braking force and the electric braking force is limited. In this form, the two braking forces are controlled according to a simple control rule, whereby it is possible to easily control an appropriate braking force required for the vehicle as a whole. This form is effective when an insufficient braking force (that will be explained) is covered by the hydraulic braking force and the electric braking force. In this case, the hydraulic braking force and the electric braking force for covering the insufficient braking force can be easily generated with respective suitable magnitudes. The distribution ratio may be fixed or may be variable depending upon some factor.

(13) The vehicle brake system according to the form (11) or (12), further comprising a regenerative brake device provided for one of the front wheel and the rear wheel for which one of the hydraulic brake device and the electric brake device is provided, the regenerative brake device being configured to generate a regenerative braking force utilizing electric power generation by rotation of the one of the front wheel and the rear wheel, wherein the hydraulic braking force, the electric braking force, and the regenerative braking force are controlled so as to cooperate with one another.

In this form, the three braking forces cooperate with one another, so as to generate the braking force required for the vehicle as a whole. This form enables construction of the brake system that makes use of the advantages of the regenerative brake device, in addition to the advantages of the hydraulic brake device and the electric brake device.

The vehicle brake system of this form includes the regenerative brake device, in addition to the hydraulic brake device and the electric brake device. The regenerative brake device is installed on vehicles driven by a power of a motor, such as electric vehicles and hybrid vehicles. The regenerative brake device permits the motor to function as an electric generator, so as to recover a part of kinetic energy of the vehicle as electric energy. Thus, the regenerative brake device generates a braking force to brake the vehicle. The magnitude of the braking force generated by the regenerative brake device, i.e., a regenerative braking force, varies depending on various factors such as a running speed of the vehicle and a charged amount of a battery in which electric energy is recovered. The vehicle brake system of this form is advantageous in that the variation of the regenerative braking force is dealt with by controlling the electric braking force that ensures good response. The three braking forces are cooperatively controlled, so that an appropriate braking force is given to the vehicle as a whole. Consequently, the vehicle brake system of this form ensures high utility especially when used for the electric vehicles and the hybrid vehicles.

(14) The vehicle brake system according to the form (13), wherein the hydraulic braking force and the electric braking force are controlled such that the hydraulic braking force and the electric braking force cover an insufficient braking force that cannot be covered by the regenerative braking force, the insufficient braking force being a shortage in a required overall braking force that is a braking force required for the vehicle as a whole.

This form is one example of the cooperation of the three braking forces. According to this form, the regenerative braking force is preferentially generated, and the hydraulic braking force and the electric braking force are generated so as to cover the shortage in the required overall braking force that cannot be covered by the regenerative braking force. In other words, this form includes a limitation as to the cooperation of the three braking forces, namely, a limitation as to the cooperation of the hydraulic braking force, the electric braking force, and the regenerative braking force. According to this form, an appropriate required overall braking force can be easily obtained owing to the cooperative control of the three braking forces even in a situation in which the regenerative braking force varies, for instance.

c. Coping with Variation in Braking Force

The following forms are for dealing with a variation in the braking force, namely, a variation in one of the hydraulic braking force and the electric braking force.

(21) The vehicle brake system according to any one of the forms (1)-(14), wherein, in a situation in which one of the hydraulic braking force and the electric braking force varies, the other of the hydraulic braking force and the electric braking force is changed so as to correspond to the variation.

In this form, the configuration of the cooperation of the hydraulic braking force and the electric braking force is limited. According to this form, when one of the hydraulic braking force and the electric braking force varies or fluctuates, the other of the hydraulic braking force and the electric braking force is changed in accordance with the variation or fluctuation, whereby an appropriate vehicle braking force is obtained. Specifically, it is possible to appropriately cope with the variation of the one of the hydraulic braking force and the electric braking force not by changing the braking force generated by one of the hydraulic brake device and the electric brake device that is generating the braking force suffering from the variation, but by changing the braking force generated by the other of the hydraulic brake device and the electric brake device (e.g., the brake device that is generating the braking force not suffering from the variation). The "situation in which one of the hydraulic braking force and the electric braking force varies" means a situation in which the hydraulic braking force or the electric braking force that is actually generated is larger or smaller, due to some reason, than the hydraulic braking force or the electric braking force that should be generated.

(22) The vehicle brake system according to the form (21), wherein, in a situation in which the one of the hydraulic braking force and the electric braking force decreases, the other of the hydraulic braking force and the electric braking force is changed.

When the braking force varies due to some reason, the braking force to be actually generated tends to become smaller than the braking force which should be generated, rather than to become larger than that. According to this form, it is possible to cope with the variation of the one of the hydraulic braking force and the electric braking force in the situation that is more likely to happen.

(23) The vehicle brake system according to the form (22), wherein the other of the hydraulic braking force and the electric braking force is increased so as to cover the decrease of the one of the hydraulic braking force and the electric braking force.

This form is one form to cope with the situation in which the one of the hydraulic braking force and the electric braking force decreases. In other words, this form is one configuration of the cooperation of the hydraulic braking force and the electric braking force. According to this form, the decrease of the one of the hydraulic braking force and the electric braking force is covered by the other of the hydraulic braking force and the electric braking force, thereby reducing or obviating a decrease of a braking force to be given to the vehicle as a whole (hereinafter referred to as "overall braking force" where appropriate). Here, "one of the hydraulic braking force and the electric braking force decreases" means that the one of the braking forces is smaller than the braking force that should be generated, namely, the one of the braking forces is insufficient. In this connection, "situation in which the one of the hydraulic braking force and the electric braking force decreases" will be hereinafter referred to as "braking-force insufficient situation" where appropriate.

(24) The vehicle brake system according to the form (22), wherein the other of the hydraulic braking force and the electric braking force is decreased in accordance with the decrease of the one of the hydraulic braking force and the electric braking force.

This form is another form to cope with the situation in which the one of the hydraulic braking force and the electric braking force decreases, i.e., the braking-force insufficient situation. In other words, this form is another configuration of the cooperation of the hydraulic braking force and the electric braking force. This form makes it possible to reduce or obviate a change in the distribution of the braking force to the front wheel and the rear wheel. It is consequently possible to reduce or obviate a change in the feeling of the brake operation as felt by the driver.

(25) The vehicle brake system according to any one of the forms (22)-(24), wherein the other of the hydraulic braking force and the electric braking force is changed in the situation in which the one of the hydraulic braking force and the electric braking force decreases due to a delay of increasing of the one of the hydraulic braking force and the electric braking force.

The situation in which the one of the hydraulic braking force and the electric braking force decreases may be a situation in which the one of the braking forces keeps decreasing throughout a time period during which the one of the braking forces is generated. Further, the situation may be a situation in which the one of the hydraulic braking force and the electric braking force becomes smaller than expected in the process of increase of the one of the braking forces due to a delay in response with respect to the increase. This form is suitable for coping with the latter situation.

(26) The vehicle brake system according to any one of the forms (22)-(25), wherein it is estimated that the vehicle is in the situation in which the one of the hydraulic braking force and the electric braking force decreases based on at least one of an environment in which the vehicle is placed and a condition of a constituent component of the vehicle brake system, and the other of the hydraulic braking force and the electric braking force is changed based on the estimation.

In this form, when factors responsible for the decrease of the one of the hydraulic braking force and the electric braking force are identified by detection or estimation, the other of the hydraulic braking force and the electric braking force is changed. According to this form, it is possible to easily cope with the variation without detecting the variation of the actual braking force. The degree of change of the other of the hydraulic braking force and the electric braking force may be determined in accordance with the degree of the identified factors.

(27) The vehicle brake system according to the form (26), wherein it is estimated that the vehicle is in the situation in which the one of the hydraulic braking force and the electric braking force decreases based on at least one of an outside temperature, an atmospheric pressure, a temperature of the electric motor, and a voltage of a battery configured to supply an electric power to the electric motor.

In this form, the factors responsible for the decrease of the one of the hydraulic braking force and the electric braking force, i.e., the factors responsible for the braking-force insufficient situation, are concretely limited. In an instance where the outside temperature is low, for instance, the viscosity of the working fluid is increased due to a temperature decrease of the working fluid of the hydraulic brake device. In this case, the response of the hydraulic braking force is deteriorated, and the hydraulic braking force becomes smaller than expected in the process of increase thereof. In an instance where the atmospheric pressure is low, the response of the hydraulic braking force is deteriorated due to a low pressure of the working fluid in a reservoir, a low pressure in an atmospheric pressure chamber of a negative-pressure booster, etc., when the pressure of the working fluid in the hydraulic brake device is raised. In this case, the response of the hydraulic braking force is deteriorated, and the hydraulic braking force becomes smaller than expected in the process of increase thereof. In an instance where the temperature of the electric motor is high, a protection circuit works, for instance, and the supply current to the electric motor is decreased. In this case, the electric braking force becomes smaller than expected in the process of increase thereof. In an instance where the voltage of the battery is lowered due to a decrease in the charged amount, etc., the supply current to the electric motor is decreased. In this case, the electric braking force becomes smaller than expected in the process of increase thereof. In this form, when any of such factors is identified, it is estimated that the one of the hydraulic braking force and the electric braking force decreases based on the identification, and the other of the hydraulic braking force and the electric braking force is changed in accordance with the decrease.

Each of the outside temperature and the atmospheric pressure may be regarded as one example of the environment in which the vehicle is placed. Each of the temperature of the electric motor and the voltage of the battery may be regarded as one example of the condition of the constituent component of the vehicle brake system. The outside temperature may be detected by an outside temperature sensor or may be obtained from information of a car navigation system. The atmospheric pressure may be detected by an atmospheric pressure sensor or may be obtained from information of a car navigation system. The temperature of the electric motor may be detected by a temperature sensor or may be estimated from a motion history of the electric motor. The voltage of the battery may be detected by a voltage sensor.

While not belonging to this form, it may be estimated that one of the hydraulic braking force and the electric braking force decreases based on the following factors, and the other of the hydraulic braking force and the electric braking force may be changed based on the estimation. For instance, a state in which air bubbles are mixed in the flow of the working fluid of the hydraulic brake device may be identified as one factor responsible for the decrease of the hydraulic braking force, and the electric braking force may be changed based on the identification. Such a state may be identified by detection of the temperature of the working fluid, estimation from a motion history of the hydraulic brake device, or estimation from a relationship between the operation amount of the brake operation member and the pressure of the working fluid.

In the hydraulic brake device or the electric brake device constituted as a disc brake device, a clearance between a disc rotor and a brake pad may relatively largely change depending upon a turning state of the vehicle in a state in which the brake pad is considerably worn. For instance, when the vehicle makes a considerably vigorous turn, the clearance becomes relatively large. In such a state, a delay is expected in generation of the braking force. In view of this, the clearance may be estimated from the position of a piston that pushes the brake pad onto the disc rotor. Further, the large clearance may be identified as one factor responsible for the decrease of the one of the hydraulic braking force and the electric braking force, and the other of the hydraulic braking force and the electric braking force may be changed based on the identification.

In an instance where the electric motor is used as a drive source for a pressurizing pump, a booster, or the like, in the hydraulic brake device, a high temperature of the electric motor and a low voltage of the battery configured to supply an electric power to the electric motor may be identified as the factors responsible for the decrease of the hydraulic braking force, as in the electric brake device. The electric braking force may be changed when the factors are identified.

(28) The vehicle brake system according to any one of the forms (22)-(25), wherein the one of the hydraulic braking force and the electric braking force that are being actually generated is detected, and wherein it is identified, based on the detection, that the vehicle is in the situation in which the one of the hydraulic braking force and the electric braking force decreases.

In this form, the factors responsible for the decrease of the braking force are not identified. Instead, the actual braking force is detected, and the decrease of the one of the hydraulic braking force and the electric braking force is coped with based on the detection. According to this form, the decrease of the actual braking force is identified not based on estimation, so that the decrease is appropriately coped with irrespective of the factors responsible for the decrease.

(29) The vehicle brake system according to the form (28), wherein the other of the hydraulic braking force and the electric braking force is changed based on the detected one of the hydraulic braking force and the electric braking force.

According to this form, the amount of change of the other of the hydraulic braking force and the electric braking force is determined based on an actual decrease amount of the one of the hydraulic braking force and the electric braking force, so that the decrease is more appropriately coped with. Here, "decrease amount" may be considered as an insufficient amount of the one of the braking forces with respect to an amount of the braking force that should be generated.

(30) The vehicle brake system according to any one of the forms (21)-(29), further comprising a regenerative brake device provided for one of the front wheel and the rear wheel for which one of the hydraulic brake device configured to generate the hydraulic braking force and the electric brake device configured to generate the electric braking force is provided, the regenerative brake device being configured to generate a regenerative braking force utilizing electric power generation by rotation of the one of the front wheel and the rear wheel for which the regenerative brake device is provided, wherein, when a switching operation is performed for increasing the one of the hydraulic braking force and the electric braking force while decreasing the regenerative braking force, the other of the hydraulic braking force and the electric braking force is changed so as to correspond to the variation in the situation in which the one of the hydraulic braking force and the electric braking force varies.

In this form, the vehicle brake system further includes the regenerative brake device. In most vehicles, the regenerative braking force generated by the regenerative brake device is configured to be replaced with other braking force at a time when the vehicle running speed becomes considerably low, for instance. Specifically, in an instance where (a) one of the hydraulic braking force and the electric braking force and (b) the regenerative braking force are given to one of the front wheel and the rear wheel, the regenerative braking force given to the one of the front wheel and the rear wheel is replaced with the one of the hydraulic braking force and the electric braking force. This form is suitable for such an instance. When the one of the hydraulic braking force and the electric braking force varies in such an instance, the other of the hydraulic braking force and the electric braking force given to the other of the front wheel and the rear wheel is changed, so that the variation is appropriately coped with.

d. Structure of Hydraulic Brake Device

The following forms relate to a structure of the hydraulic brake device.

(31) The vehicle brake system according to any one of the forms (1)-(30), wherein the hydraulic brake device includes:

a rotation body configured to rotate together with the one of the front wheel and the rear wheel;

a friction member configured to be pressed onto the rotation body;

a wheel cylinder configured to operate by the working fluid supplied thereto for pressing the friction member onto the rotation body;

a pump configured to pressurize the working fluid and to supply the pressurized working fluid to the wheel cylinder; and a pressure holding valve configured to controllably hold the pressure of the working fluid to be supplied to the wheel cylinder.

This form includes a limitation as to the structure of the hydraulic brake device. In most hydraulic brake devices configured to control the hydraulic braking force using a control valve, two kinds of control valves are used, i.e., a control valve for increasing the pressure of the working fluid to be supplied to the wheel cylinder and a control valve for decreasing the pressure of the working fluid. In the hydraulic brake device of this form, in contrast, the pressure of the working fluid to be supplied to the wheel cylinder is decreased, for instance, by the pressure holding valve while the working fluid having a high pressure is directly supplied from the pump, so that the pressure of the working fluid is kept at a target pressure. That is, the hydraulic braking force is controlled by only one control valve, not by two control valves. Consequently, the hydraulic brake device can be made compact in size, and the vehicle brake system itself can be accordingly made compact in size.

(32) The vehicle brake system according to the form (31), wherein the hydraulic brake device further includes:
a master cylinder including (a) a piston coupled to the brake operation member and (b) a pressurizing chamber in which the working fluid introduced thereinto is pressurized by a movement of the piston, the master cylinder being configured to pressurize the working fluid by an operation force applied by the driver to the brake operation member;
a master fluid passage through which the working fluid pressurized in the pressurizing chamber of the master cylinder is supplied to the wheel cylinder; and
an open/close valve configured to open and close the master fluid passage,
wherein an operation of the wheel cylinder by the working fluid supplied from the master cylinder and an operation of the wheel cylinder by the working fluid supplied from the pump are selectively established based on an operation state of the open/close valve.

In the hydraulic brake device according to this form, generation of the hydraulic braking force that depends on the operation force of the driver via the master cylinder and generation of the hydraulic braking force by the pump and the pressure holding valve without depending on the operation force are switchable. According to this form, when an electric failure occurs in the hydraulic brake device, the hydraulic braking force that depends on the operation force is generated, whereby the vehicle brake system that is excellent in terms of failsafe is effectuated. In an instance where an electromagnetic valve is used as the open/close valve, it is preferable, in terms of failsafe, to use a normally-opened electromagnetic valve, namely, an electromagnetic valve configured to open the master fluid passage in a state in which no electric current is supplied, i.e., in a non-energized state.

(33) The vehicle brake system according to the form (32), wherein the hydraulic brake device includes: a reservoir which stores the working fluid and from which the pump pumps up the working fluid; and a reservoir fluid passage which connects the reservoir and the pump, and
wherein the pressure holding valve allows a part of the working fluid that is to be supplied from the pump to the wheel cylinder to pass through the pressure holding valve so as to control the pressure of the working fluid, and the part of the working fluid which has passed through the pressure holding valve flows into the reservoir or the reservoir fluid passage.

In the hydraulic brake device of this form, the working fluid ejected from the pump is efficiently returned through the pressure holding valve in a state in which the hydraulic braking force is generated. For higher efficiency, the working fluid that has passed through the pressure holding valve flows desirably into the reservoir fluid passage, not into the reservoir. In an instance where the working fluid that has passed through the pressure holding valve is arranged to flow into the reservoir fluid passage, it is desirable that the working fluid be arranged to flow into the reservoir fluid passage at a position near the pump. This form is applicable to a form that does not employ the master cylinder, as well as the form that employs the master cylinder.

(34) The vehicle brake system according to the form (33), wherein the hydraulic brake device includes a cut-off valve configured to cut a flow of the working fluid into the reservoir or the reservoir fluid passage when the wheel cylinder is operated by the working fluid supplied from the master cylinder in a state in which the open/close valve is opened.

According to the hydraulic brake device of this form, the working fluid to be supplied to the wheel cylinder is effectively prevented from flowing into the reservoir when the hydraulic braking force that depends on the operation force is generated. From the viewpoint of failsafe against the electric failure, in an instance where an electromagnetic valve is employed as the cut-off valve, it is desirable to employ a normally-closed electromagnetic valve, i.e., an electromagnetic valve configured to cut off the flow of the working fluid in a state in which no electric current is supplied thereto, i.e., a non-energized state.

(35) The vehicle brake system according to the form (33) or (34), wherein the reservoir is disposed near the master cylinder, and the working fluid from the reservoir is pressurized in the pressurizing chamber of the master cylinder.

In the hydraulic brake device of this form, it may be considered that a reservoir for the master cylinder and a reservoir for the pump are made common to each other. It may be further considered that the pump utilizes the reservoir for the master cylinder and pumps up the working fluid from the reservoir. In the hydraulic brake device of this form, only one reservoir is needed even when the hydraulic brake device is equipped with the master cylinder. Thus, the hydraulic brake device is compact in size.

(36) The vehicle brake system according to any one of the forms (32)-(35), wherein the hydraulic brake device includes a stroke simulator provided on the master fluid passage and configured to allow the operation of the brake operation member while giving, to the brake operation member, a counterforce in accordance with the operation of the brake operation member when the wheel cylinder is operated by the working fluid supplied from the pump in a state in which the open/close valve is closed.

When the open/close valve is closed for generating the hydraulic braking force by activation of the pump, the working fluid pressurized in the master cylinder is supplied nowhere, and the operation stroke of the brake operation member does not occur. Consequently, the feeling of the brake operation is deteriorated. For obviating the drawback, the stroke simulator is provided in the hydraulic brake device. According to this form, the brake operation member can be operated with a good feeling even in a situation in which is generated the hydraulic braking force that does not depend on the operation force applied to the brake operation member. The stroke simulator may have any known structure. For instance, the stroke simulator may include: a fluid chamber which communicates with the master fluid passage and whose volume is variable; and an elastic body configured to apply, to the working fluid in the fluid chamber, a force in accordance with an amount of volume increase of the fluid chamber.

(37) The vehicle brake system according to any one of the forms (31)-(36), wherein the pump and the pressure holding valve of the hydraulic brake device are incorporated in an actuator unit.

In the hydraulic brake device of this form, the pump and the pressure holding valve are unified, so as to provide a single unit, i.e., an actuator unit. The actuator unit contributes to a reduction in the size of the hydraulic brake device. The actuator unit may be constructed such that a motor for activating the pump is incorporated thereinto, for instance. Further, the actuator unit desirably includes therein a fluid passage that connects constituent components, such as the pump and the pressure holding valve, to one another. In an instance where the hydraulic brake device includes the open/close valve and the cut-off valve descried above, those valves may be incorporated into the actuator unit. The hydraulic brake device is provided for one of the front wheel and the rear wheel, whereby the actuator unit is comparatively compact in size.

(38) The vehicle brake system according to any one of the forms (31)-(37), wherein the pressure holding valve is an electromagnetic linear valve configured to decrease the pressure of the working fluid to be supplied to the wheel cylinder to a pressure in accordance with an electric current supplied to the electromagnetic linear valve.

According to this form, the electromagnetic linear valve for decreasing the pressure of the working fluid is employed as the pressure holding valve, whereby the hydraulic braking force to be generated by the hydraulic brake device can be easily and accurately controlled.

BRIEF DESCRIPTION OF THE DRAWINGS

The objects, features, advantages, and technical and industrial significance of the present disclosure will be better understood by reading the following detailed description of embodiments, when considered in connection with the accompanying drawings, in which.

DETAILED DESCRIPTION OF THE EMBODIMENTS

Figure 1:
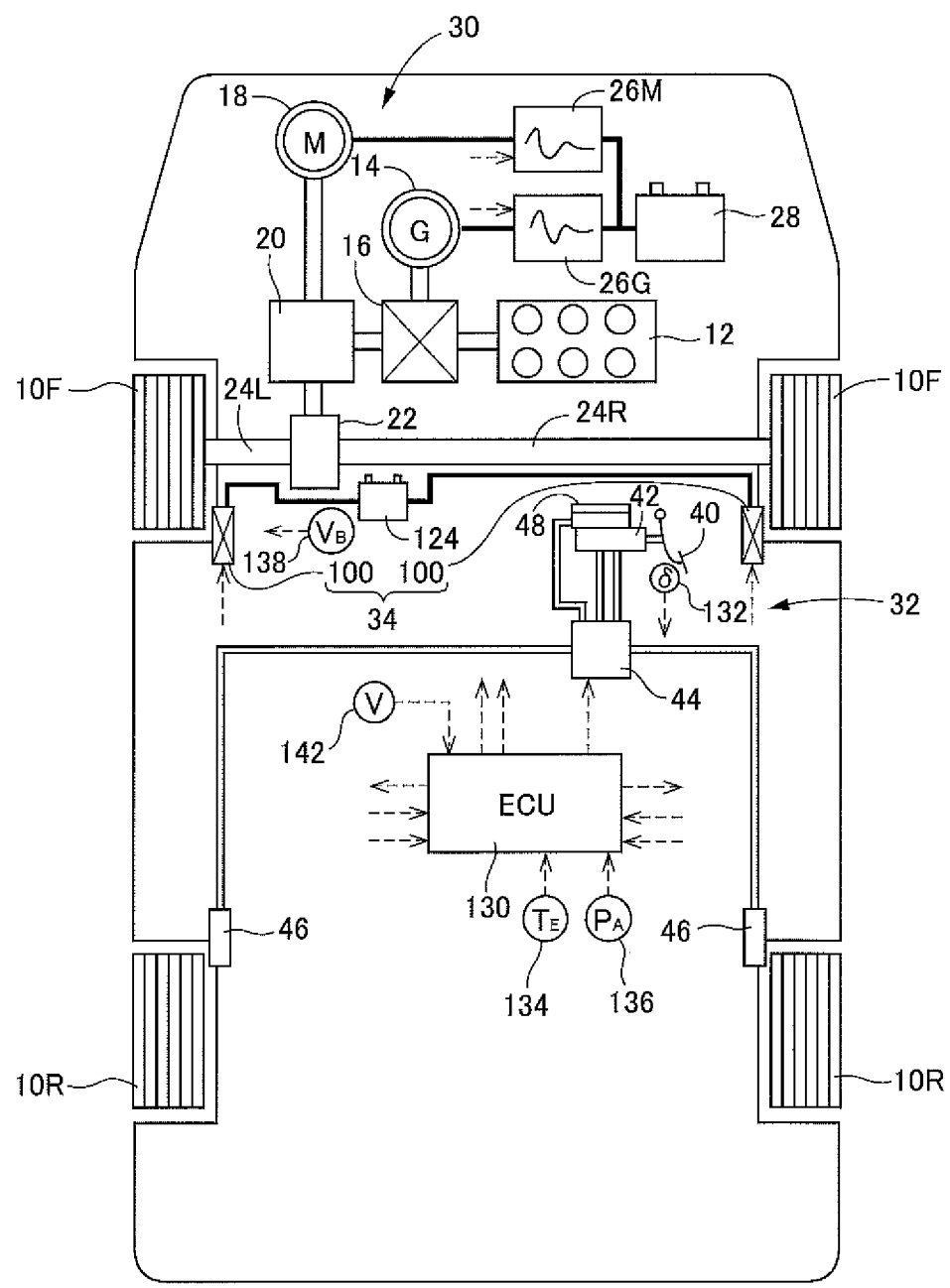
FIG. 1 is a view conceptually showing an overall structure of a vehicle brake system according to a first embodiment.

Referring to the drawings, there will be explained in detail embodiments of the vehicle brake system according to various forms indicated above and modifications of the embodiments. It is to be understood that the vehicle brake system according to the present disclosure is not limited to the details of the following embodiments and the forms described in VARIOUS FORMS, but may be changed and modified based on the knowledge of those skilled in the art.

Embodiment 1

A. Outline of Vehicle Drive System and Vehicle Brake System

As schematically shown in FIG. 1, a vehicle on which a vehicle brake system according to a first embodiment is installed is a hybrid vehicle having two front wheels 10F and two rear wheels 10R, and the two front wheels 10F are drive wheels. The vehicle drive system is first explained. The vehicle drive system installed on the present vehicle includes an engine 12 as a drive source, a generator 14 that mainly functions as an electric generator, a power-distribution mechanism 16 to which the engine 12 and the generator 14 are coupled, and an electric motor 18 as another drive source.

The power-distribution mechanism 16 has a function of distributing rotation of the engine 12 to rotation of the generator 14 and rotation of an output shaft. The electric motor 18 is coupled to the output shaft via a reduction mechanism 20 functioning as a speed reducer. Rotation of the output shaft is transmitted to the front left and right wheels 10F via a differential mechanism 22 and respective drive shafts 24L, 24R, so that the front left and right wheels 10F are drivingly rotated. The generator 14 is coupled to a battery 28 via an inverter 26G. Electric energy obtained by electric power generation of the generator 14 is stored in the battery 28. The electric motor 18 is coupled to the battery 28 via an inverter 26M. The electric motor 18 and the generator 14 are controlled by controlling the inverter 26M and the inverter 26G.

As schematically shown in FIG. 1, the vehicle brake system of the first embodiment installed on the present vehicle includes (a) a regenerative brake device 30 configured to give a braking force to each of the two front wheels 10F, (b) a hydraulic brake device 32 configured to give a braking force to each of the two rear wheels 10R, and (c) an electric brake device 34 configured to give a braking force to each of the two front wheels 10F, independently of the braking force given by the regenerative brake device 30. In the vehicle brake system, the hydraulic brake device 32 is not provided for both of the front wheels 10F and the rear wheels 10R, but for only the rear wheels 10R. Thus, the hydraulic brake device 32 is compact, and the vehicle brake system itself is accordingly compact.

B. Structure of Regenerative Brake Device

In terms of hardware, the regenerative brake device 30 constitutes a part of the vehicle drive system. When the vehicle decelerates, the electric motor 18 is rotated by rotation of the front wheels 10F without receiving a power supply from the battery 28. The electric motor 18 generates electric power utilizing an electromotive force generated by its rotation, and the generated electric power is stored, via the inverter 26M, in the battery 28 as a quantity of electricity (which may be also referred to as an electric quantity or an electric charge). That is, the electric motor 18 functions as an electric generator, so that the battery 28 is charged. The rotation of the front wheels 10F is decelerated, namely, the vehicle is decelerated, by an amount corresponding to energy that corresponds to the charged electric quantity. In the present vehicle, the regenerative brake device 30 is thus configured. The braking force given by the regenerative brake device 30 to the front wheels 10F (hereinafter referred to as "regenerative braking force" where appropriate) depends on the amount of the generated electric power, and the generated regenerative braking force is controlled by controlling the inverter 26M. A detailed explanation of the regenerative brake device 30 is dispensed with because any regenerative brake device having a known ordinary structure can be employed as the regenerative brake device 30.

C. Structure of Hydraulic Brake Device i) Overall Structure

The hydraulic brake device 32 includes (a) a master cylinder 42 to which is connected a brake pedal 40, as a brake operation member, to be operated by a driver, (b) an actuator unit 44 configured to allow the working fluid from the master cylinder 42 to pass therethrough so as to supply the working fluid or configured to adjust the pressure of the working fluid pressurized by its pump (that will be explained) so as to supply the working fluid, and (c) two wheel brakes 46 respectively provided for the right and left rear wheels 10R and configured to decelerate rotation of the respective right and left rear wheels 10R by the pressure of the working fluid supplied from the actuator unit 44. The hydraulic brake device 32 is a two-system or tandem device corresponding to the right and left rear wheels 10. The actuator unit 44 may be regarded as a brake actuator in which a plurality of constituent components are unified. The actuator unit 44 functions as a pressure adjuster configured to adjust the pressure of the working fluid and to supply the pressure-adjusted working fluid.

ii) Structure of Master Cylinder

Figure 2:
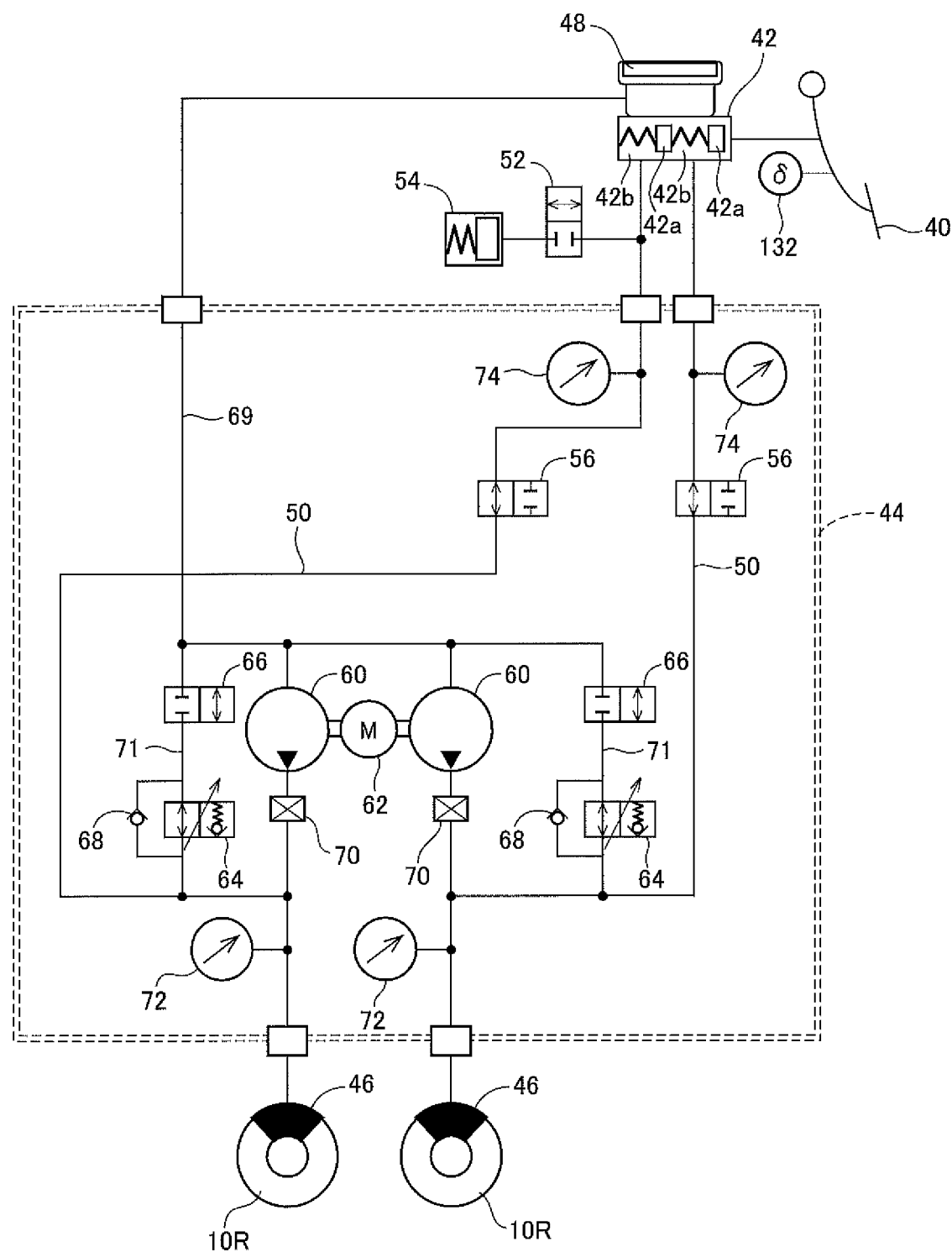
FIG. 2 is a hydraulic circuit diagram of a hydraulic brake device of the vehicle brake system shown in FIG. 1.

As shown in FIG. 2, the master cylinder 42 is a tandem cylinder device including, in a housing, two pistons 42a arranged in series and connected to the brake pedal 40 and two pressurizing chambers 42b in each of which the working fluid that has introduced thereinto is pressurized by a movement of a corresponding one of the pistons 42a. A reservoir 48 that stores the working fluid at the atmospheric pressure is disposed near the master cylinder 42. The working fluid from the reservoir 48 is pressurized in each of the two pressurizing chambers 42b. The master cylinder 42 is configured to supply, to the actuator unit 44, the working fluid whose pressure corresponds to a force applied to the brake pedal 40 (hereinafter referred to as "brake operation force" where appropriate), for the respective two systems that correspond to the respective two rear wheels 10R. Specifically, the actuator unit 44 has fluid passages through which the working fluid supplied from the master cylinder 42 flows toward the respective wheel brakes 46. That is, the hydraulic brake device 32 has two fluid passages through which the working fluid is supplied from the master cylinder 42 to the respective wheel brakes 46, i.e., two master fluid passages 50. In the hydraulic brake device 32, the working fluid can be supplied from the master cylinder 42 to the wheel brakes 46 via the respective master fluid passages 50. Each of the wheel brakes 46 has a wheel cylinder (that will be explained), and the working fluid is supplied to the wheel cylinder.

To one of the two master fluid passages 50, a stroke simulator 54 is connected via a simulator opening valve 52 which is a normally-closed electromagnetic open/close valve. In a normal operating condition in which no electric failure is occurring, the simulator opening valve 52 is energized into a valve open state, so that the stroke simulator 54 operates. In the normal operating condition, two master-cut valves 56, which are the electromagnetic open/close valves and which are provided in the actuator unit 44 so as to correspond to the two systems, are placed in a valve closed state, so that the stroke simulator 54 permits a depression stroke of the brake pedal 40 and gives, to the brake pedal 40, an operation counterforce in accordance with the depression stroke. That is, the stroke simulator 54 has a function of enhancing a feeling of the brake operation as felt by the driver in the normal operating condition. The stroke simulator 54 of the present embodiment has a known structure. For instance, the stroke simulator 54 includes: a fluid chamber which communicates with the master fluid passage 50 and whose volume is variable; and an elastic body configured to apply, to the working fluid in the fluid chamber, a force in accordance with an amount of volume increase of the fluid chamber. Thus, the stroke simulator 54 is not explained in detail here.

iii) Structure of Actuator Unit

The actuator unit 44 includes: the two master-cut valves 56, each as a normally-opened electromagnetic open/close valve, configured to open and close the respective two master fluid passages 50; two pumps 60 that correspond to the two systems; a motor 62 for driving the pumps 60; two pressure holding valves (pressure control valves) 64, each as an electromagnetic linear valve, corresponding to the two systems; two cut-off valves 66, each as a normally-closed electromagnetic open/close valve, disposed in series with the respective pressure holding valves 64; and two check valves 68 disposed in parallel with the respective pressure holding valves 64. In the hydraulic brake device 32, only one reservoir is provided, and the two pumps 60 are configured to pump up the working fluid from the reservoir 48. To this end, there is formed a reservoir fluid passage 69 that connects the two pumps 60 and the reservoir 48, and a part of the reservoir fluid passage 69 is located in the actuator unit 44. Each of the pumps 60 is connected to the corresponding master fluid passage 50 on its ejection side and supplies, to the corresponding wheel brake 46, the pressurized working fluid via a part of the master fluid passage 50. On the ejection side of each pump 60, a buffer 70 is provided for mitigating a pulsing change of the pressure of the working fluid ejected from the corresponding pump 60. In the actuator unit 44, there are formed two return passages 71 each of which is disposed in parallel with the corresponding pump 60 and connects the corresponding master fluid passage 50 and the reservoir fluid passage 69 to each other. The pressure holding valve 64 and the cut-off valve 66 are provided on each of the two return passages 71. The pressure holding valve 64 has a function of adjusting the pressure of the working fluid to be supplied to the wheel brake 46. In view of this, the pressure holding valve 64 may be also referred to as a "pressure adjusting valve". The cut-off valve 66 has a function of shutting off the working fluid to be supplied to the wheel brake 46. In view of this, the cut-off valve 66 may be also referred to as a "shut-off valve".

In the normal operating condition, the master-cut valves 56 are in the valve closed state while the cut-off valves 66 are in the valve open state. When the pumps 60 are driven by the motor 62, the working fluid in the reservoir 48 is pressurized and the pressurized working fluid is supplied to the wheel brakes 46. Each pressure holding valve 64 has a function of adjusting the pressure of the working fluid to be supplied to the corresponding wheel brake 46 to a pressure in accordance with an electric current supplied to the pressure holding valve 64. In other words, each pressure holding valve 64 is constituted as a pressure-decrease electromagnetic linear valve having a function of decreasing the pressure of the working fluid to be supplied to the wheel brake 46. In the hydraulic brake device 32, the working fluid whose pressure is adjusted by controlling the pressure holding valves 64 is supplied to the wheel brakes 46 without depending on the pressure of the working fluid supplied from the master cylinder 42, namely, without depending on the brake operation force applied to the brake pedal 40. The pressure holding valve 64 is a pressure-decrease valve, and the working fluid passes through the pressure holding valve 64 for pressure adjustment. The working fluid that has passed through each pressure holding valve 64 returns to the reservoir fluid passage 69 and accordingly to the reservoir 48 via the corresponding return passage 71 and the corresponding cut-off valve 66 in the valve open state.

In an instance where the hydraulic brake device 32 is suffering from an electric failure, the master-cut valves 56 are placed in the valve open state while the cut-off valves 66 are placed in the valve closed state, so that the working fluid supplied from the master cylinder 42 to the actuator unit 44 is supplied to the wheel brakes 46. In other words, when the wheel cylinders (which will be explained) are operated by the working fluid supplied from the master cylinder 42 in a state in which the master-cut valves 56, each as the open/close valve, are opened, each cut-off valve 66 cuts a flow of the working fluid into the reservoir 48 or the reservoir fluid passage 69. Two wheel cylinder pressure sensors 72 and two master pressure sensors 74 are provided so as to correspond to the two systems. Each wheel cylinder pressure sensor 72 is configured to detect the pressure of the working fluid to be supplied to the corresponding wheel brake 46 (hereinafter referred to as "wheel cylinder pressure" where appropriate). Each master pressure sensor 74 is configured to detect the pressure of the working fluid supplied from the master cylinder 42 (hereinafter referred to as "master pressure" where appropriate).

iv) Structure of Wheel Brake

Figure 3A:
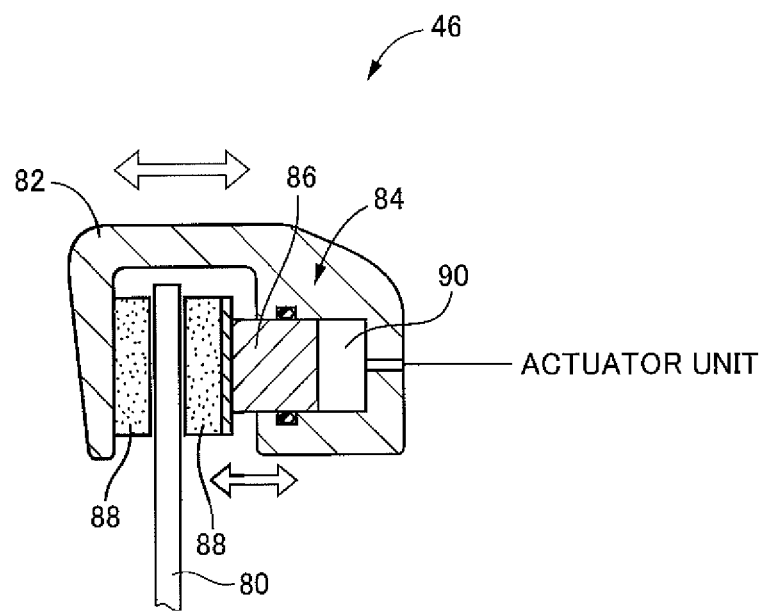
FIG. 3A is a cross-sectional view of a wheel brake of the hydraulic brake device of the vehicle brake system shown in FIG. 1

Each wheel brake 46 for stopping rotation of the corresponding rear wheel 10R is a disc brake device schematically shown in FIG. 3A. Each wheel brake 46 includes a disc rotor 80, as a rotation body, configured to rotate together with the corresponding rear wheel 10R and a caliper 82 movably supported by a carrier that rotatably holds the rear wheel 10R. The caliper 82 incorporates a wheel cylinder 84 whose housing is defined by a part of the caliper 82. A pair of brake pads 88, each as a friction member, is provided such that one brake pad 88 is attached to and held by a distal end of a piston 86 of the wheel cylinder 84 and the other brake pad 88 is attached to and held by a portion of the caliper 82 located opposite to a portion thereof in which the wheel cylinder 84 is incorporated. Thus, the two brake pads 88 are opposed to each other with the disc rotor 80 interposed therebetween.

The working fluid is supplied from the actuator unit 44 to a fluid chamber 90 of the wheel cylinder 84, and the pressure of the working fluid causes the brake pads 88 to nip the disc rotor 80 therebetween. That is, the wheel cylinder 84 is operated to cause the brake pads 88 to be pushed onto the disc rotor 80. Thus, each wheel brake 46 generates, utilizing a friction force, a braking force to stop rotation of the corresponding rear wheel 10R, i.e., a braking force to brake the vehicle (hereinafter referred to as "hydraulic braking force" where appropriate). The hydraulic braking force has a magnitude in accordance with the pressure of the working fluid supplied from the actuator unit 44. The wheel brakes 46 have a known ordinary structure, and a detailed explanation thereof is dispensed with.

In the hydraulic brake device 32, the pressure of the working fluid to be supplied to the wheel cylinder 84 is decreased by the pressure holding valve 64 while the working fluid having a high pressure is directly supplied from the pump 60, whereby the pressure of the working fluid is kept at a target pressure. That is, the hydraulic braking force to be generated by each wheel brake 46 is controlled by only one control valve, not by two control valves. Consequently, the actuator unit 44 of the hydraulic brake device 32 is compact in size, so that the hydraulic brake device as a whole is accordingly compact in size. Further, the vehicle brake system itself is compact in size.

D. Structure of Electric Brake Device

Figure 3B:
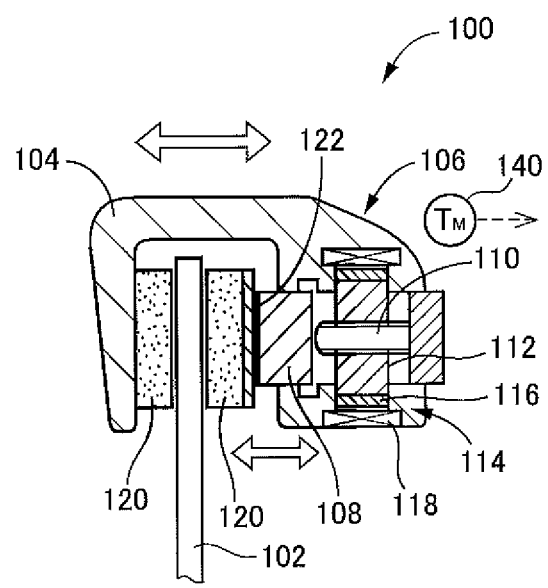
FIG. 3B is a cross-sectional view of a wheel brake of an electric brake device of the vehicle brake system shown in FIG. 1.

As shown in FIG. 1, the electric brake device 34 includes a pair of wheel brakes 100 for stopping rotation of the corresponding front wheels 10F. As shown in FIG. 3B, each wheel brake 100 is similar in structure to the wheel brakes 46 of the hydraulic brake device 32. Each wheel brake 46 operates by the pressure of the working fluid whereas each wheel brake 100 operates by a power of an electric motor.

Each wheel brake 100 includes a disc rotor 102, as a rotation body, configured to rotate together with the corresponding front wheel 10F and a caliper 104 movably supported by a carrier that rotatably holds the corresponding front wheel 10F. The caliper 104 incorporates an electric actuator 106. The electric actuator 106 includes (a) a plunger 108 held by the caliper 104 so as to be advanceable and retractable, (b) a threaded rod 110 which is held by the caliper 104 so as to be unrotatable and so as to be advanceable and retractable relative to disc rotor 102 and which has an external thread formed on its outer circumference, (c) a nut 112 which has an internal thread that is held in engagement with the external thread of the threaded rod 110 and which is held by the caliper 104 so as to be rotatable and so as not to be advanceable and retractable relative to the disc rotor 102, and (d) an electric motor 114 configured to rotate the nut 112. The electric motor 114 includes: magnets 116 attached to an outer circumference of the nut 112; and coils 118 held by the caliper 104.

A pair of brake pads 120, each as a friction member, is provided such that one brake pad 120 is attached to and held by a distal end of the plunger 108 of the electric actuator 106 and the other brake pad 120 is attached to and held by a portion of the caliper 104 located opposite to a portion thereof in which the electric actuator 106 is disposed. Thus, the two brake pads 120 are opposed to each other with the disc rotor 102 interposed therebetween. The electric actuator 106 is configured such that the brake pads 120 are pushed onto the disc rotor 102 by rotation of the electric motor 114 as a drive source. In other words, the electric actuator 106 includes a mechanism constituted by the plunger 108, the threaded rod 110, and the nut 112, namely, a motion converting mechanism for moving the friction members by the power of the electric motor 114. That is, each wheel brake 100 of the electric brake device 34 controls a force to be generated by the electric motor 114 and applies the force as a force for stopping or decelerating the rotation of the wheel, via the motion converting mechanism.

Thus, each wheel brake 100 of the electric brake device 34 generates, utilizing a friction force, a braking force to stop rotation of the corresponding front wheel 10F, namely, a braking force to brake the vehicle (hereinafter referred to as "electric braking force" where appropriate). The electric braking force depends on a pushing force by which the brake pad 120 is pushed by the plunger 108. Each wheel brake 100 has a pushing force sensor 122, as a load cell, provided between the plunger 108 and the brake pad 120 for detecting the pushing force. The wheel brakes 100 have a known ordinary structure, and a detailed explanation thereof is dispensed with. As shown in FIG. 1, an electric current is supplied to the electric motor 114 of each wheel brake 100 from an auxiliary battery 124 different from the battery 28.

E. Control of Vehicle Brake System i) Controller

The control of the present brake system, namely, the control of a braking force F, is executed by an electronic control unit (ECU) 130, as a controller, shown in FIG. 1. (Respective braking forces are collectively referred to as "braking force F" where appropriate). The ECU 130 includes a computer and drivers (drive circuits) for components to be controlled. Specifically, the ECU 130 controls the inverters 26G, 26M that constitute the regenerative brake device 30, the pressure holding valves 64 of the actuator unit 44 that constitutes the hydraulic brake device 32, and the electric motors 114 of the wheel brakes 100 that constitute the electric brake device 34, thereby controlling a regenerative braking force $F_{RG}$, a hydraulic braking force $F_{HY}$, and an electric braking force $F_{EM}$. Consequently, an overall braking force $F_{SUM}$, which is the braking force F to be given to the vehicle as a whole, is controlled.

ii) Outline of Basic Control

In a basic control of the present brake system, a required overall braking force $F_{SUM}^*$, which is a braking force F required for the vehicle as a whole (i.e., a sum of the braking forces F to be given to the four wheels 10), is determined based on an operation of the brake pedal 40. Specifically, the brake pedal 40 is provided with an operation force sensor 132 for detecting an operation force δ of the brake pedal 40, as shown in FIGS. 1 and 2. The ECU 130 obtains the required overall braking force $F_{SUM}^*$ by multiplying the operation force δ detected by the operation force sensor 132 by a braking force coefficient $α_F$. The operation force δ is one example of an operation value indicative of a degree of the operation of the brake pedal 40, namely, indicative of a degree of the brake operation, and may be considered as a parameter indicative of the required overall braking force $F_{SUM}^*$.

In the present brake system, the regenerative braking force $F_{RG}$ is preferentially generated, and the hydraulic braking force $F_{HY}$ and the electric braking force $F_{EM}$ cover a shortage in the required overall braking force $F_{SUM}^*$ that cannot be covered by the regenerative braking force $F_{RG}$. The shortage will be referred to as "insufficient braking force $F_{IS}$". The regenerative braking force $F_{RG}$, the hydraulic braking force $F_{HY}$, and the electric braking force $F_{EM}$ correspond to a sum of the braking forces F to be given to two wheels 10, i.e., two front wheels 10F or two rear wheels 10R, respectively by the regenerative brake device 30, the hydraulic brake device 32, and the electric brake device 34. Actually, there are given, to each of the two front wheels 10F or each of the two rear wheels 10R, a half of the regenerative braking force $F_{RG}$, a half of the hydraulic braking force $F_{HY}$, and a half of the electric braking force $F_{EM}$. For the sake of brevity, the two front wheels 10F are regarded as a virtual one front wheel 10F, and the two rear wheels 10R are regarded as a virtual one rear wheel 10R, and the following explanation will be made on the understanding that the regenerative braking force $F_{RG}$, the hydraulic braking force $F_{HY}$, and the electric braking force $F_{EM}$ are given to the one front wheel 10F or the one rear wheel 10R.

The control of the braking force F will be concretely explained. Initially, a maximum regenerative braking force $F_{RG-MAX}$, which is the regenerative braking force $F_{RG}$ that can be generated at that time, is identified based on a state of charge (SOC) of the battery 28, a running speed of the vehicle, and so on. In an instance where the required overall braking force $F_{SUM}^*$ is equal to or smaller than the maximum regenerative braking force $F_{RG-MAX}$, a required regenerative braking force $F_{RG}^*$, which is the regenerative braking force $F_{RG}$ to be required, is determined as the required overall braking force $F_{SUM}^*$. On the other hand, in an instance where the required overall braking force $F_{SUM}^*$ is in excess of the maximum regenerative braking force $F_{RG-MAX}$, the required regenerative braking force $F_{RG}^*$ is determined as the maximum regenerative braking force $F_{RG-MAX}$.

Subsequently, the insufficient braking force $F_{IS}$ is determined by subtracting the required regenerative braking force $F_{RG}^*$ from the required overall braking force $F_{SUM}^*$. By respectively multiplying the insufficient braking force $F_{IS}$ by a hydraulic braking force distribution coefficient $β_{HY}$ and an electric braking force distribution coefficient $β_{EM}$ ($β_{HY} + β_{EM} = 1$), a required hydraulic braking force $F_{HY}^*$ which is the hydraulic braking force $F_{HY}$ to be generated and a required electric braking force $F_{EM}^*$ which is the electric braking force $F_{EM}$ to be generated are determined. Here, the hydraulic braking force distribution coefficient $\beta_{HY}$ is for obtaining an amount of the hydraulic braking force $F_{HY}$ to be distributed to the rear wheel 10R, and the electric braking force distribution coefficient $\beta_{EM}$ is for obtaining an amount of the electric braking force $F_{EM}$ to be distributed to the front wheel 10F.

The regenerative brake device 30, the hydraulic brake device 32, and the electric brake device 34 are controlled based on the required regenerative braking force $F_{RG}^*$, the required hydraulic braking force $F_{HY}^*$, and the required electric braking force $F_{EM}^*$ determined as described above, whereby the overall braking force $F_{SUM}$ based on the required overall braking force $F_{SUM}^*$ is given to the vehicle. The required regenerative braking force $F_{RG}^*$, the required hydraulic braking force $F_{HY}^*$, and the required electric braking force $F_{EM}^*$ may be regarded as targets of the braking forces F to be generated respectively by the regenerative brake device 30, the hydraulic brake device 32, and the electric brake device 34. In this sense, those braking forces $F_{RG}^*$, $F_{HY}^*$, and $F_{EM}^*$ may be respectively referred to as a target regenerative braking force, a target hydraulic braking force, and a target electric braking force.

Figure 4:
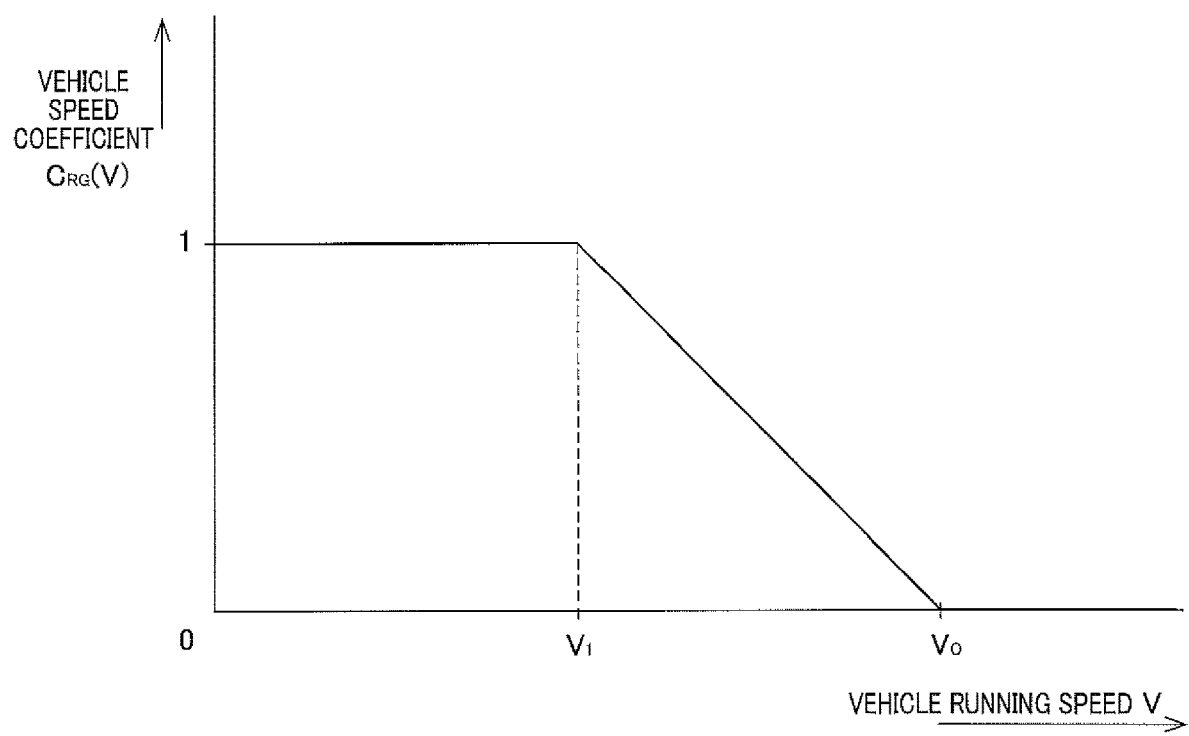
FIG. 4 is a graph showing a vehicle speed coefficient used when the regenerative braking force is replaced with the hydraulic braking force in the process of deceleration of the vehicle.

When a running speed v of the vehicle is lower than a threshold speed $v_0$ (e.g., 10 km/hr) at the time of start of the brake operation, namely, at the beginning of depressing the brake pedal 40, the regenerative braking force $F_{RG}$ is not generated till an end of this brake operation. When the vehicle running speed v becomes lower than the threshold speed $v_0$ as a result of the brake operation, the regenerative braking force $F_{RG}$ that is being generated is gradually decreased to 0 so as to be replaced with the hydraulic braking force $F_{HY}$ before the vehicle running speed v becomes equal to a threshold speed $v_1$ (e.g., 5 km/hr) lower than the threshold speed $v_0$, and the hydraulic braking force $F_{HY}$ is gradually increased by an amount corresponding to a decrease amount of the regenerative braking force $F_{RG}$. In other words, there is executed a switching operation in which the hydraulic braking force $F_{HY}$ is increased while the regenerative braking force $F_{RG}$ is decreased. Specifically, a vehicle speed coefficient $C_{RG}(v)$ which utilizes the vehicle running speed v as a parameter is set as shown in a graph of FIG. 4. By multiplying the required regenerative braking force $F_{RG}^*$ by the vehicle speed coefficient $C_{RG}(v)$, a regenerative braking force decrease amount $dF_{RG}$ is determined. By subtracting the regenerative braking force decrease amount $dF_{RG}$ from the required regenerative braking force $F_{RG}^*$ and adding the regenerative braking force decrease amount $dF_{RG}$ to the required hydraulic braking force $F_{HY}^*$, the required regenerative braking force $F_{RG}^*$ and the required hydraulic braking force $F_{HY}^*$ are corrected. It is noted that the threshold speed $v_0$ used at the time of start of the brake operation and the threshold speed $v_0$ used when the vehicle running speed v becomes lower may differ from each other.

Figure 5:
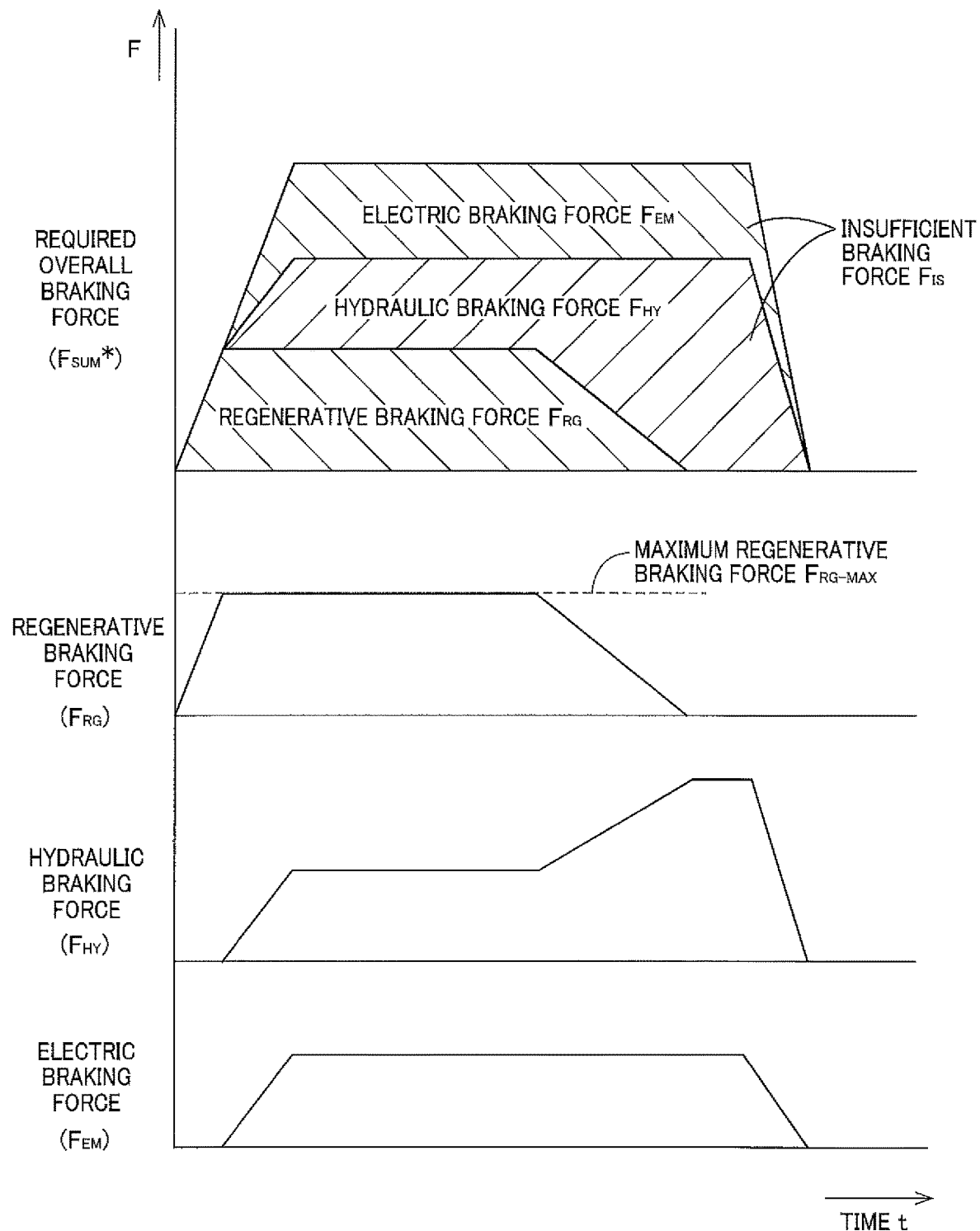
FIG. 5 is a graph showing changes, with passage of time, of the regenerative braking force, the hydraulic braking force, and the electric braking force generated by a basic control, the changes being caused with progress of a brake operation.

FIG. 5 shows one example of changes, with passage of time, of the regenerative braking force $F_{RG}$, the hydraulic braking force $F_{HY}$, and the electric braking force $F_{EM}$ generated according to the basic control described above, the changes being caused when the brake operation progresses. In FIG. 5, a change of the required overall braking force $F_{SUM}^*$ is also shown. FIG. 5 shows the changes in a case in which the brake operation is started when the vehicle running speed v is higher than the threshold speed $v_0$ and in which the required overall braking force $F_{SUM}^*$ is larger than the maximum regenerative braking force $F_{RG-MAX}$.

In the example shown in FIG. 5, when the required overall braking force $F_{SUM}^*$ increases after the brake operation has been started, the required overall braking force $F_{SUM}^*$ is covered by the regenerative braking force $F_{RG}$ before the regenerative braking force $F_{RG}$ exceeds the maximum regenerative braking force $F_{RG-MAX}$. From a time point when the regenerative braking force $F_{RG}$ exceeds the maximum regenerative braking force $F_{RG-MAX}$, the hydraulic braking force $F_{HY}$ and the electric braking force $F_{EM}$ are generated at a distribution ratio ($\beta_{HY}$:$\beta_{EM}$) based on the hydraulic braking force distribution coefficient $\beta_{HY}$ and the electric braking force distribution coefficient $\beta_{EM}$, so as to cover the insufficient braking force $F_{IS}$. In a time period from a time point when the vehicle running speed v becomes lower than the threshold speed $v_0$ to a time point when the vehicle running speed v becomes equal to the threshold speed $v_1$ as the brake operation progresses, the regenerative braking force $F_{RG}$ is decreased, and the hydraulic braking force $F_{HY}$ is increased by the decrease amount of the regenerative braking force $F_{RG}$. At the end of the brake operation, the required overall braking force $F_{SUM}^*$ is decreased, and the hydraulic braking force F and the electric braking force $F_{EM}$ are decreased.

Figure 6A:
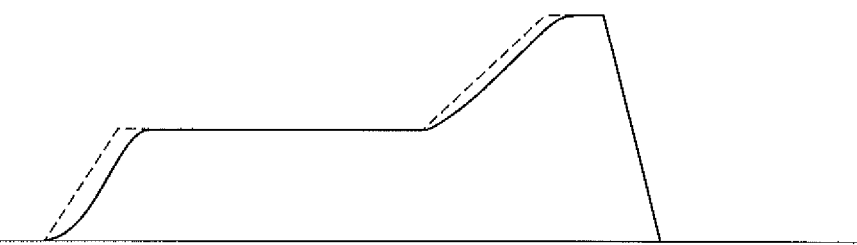
FIG. 6A is a graph showing a variation of the hydraulic braking force and FIGS. 6B and 6C are graphs each showing that the electric braking force is changed to cope with the variation.

According to the basic control explained above, the regenerative braking force $F_{RG}$ is preferentially generated, and the hydraulic braking force $F_{HY}$ and the electric braking force $F_{EM}$ cover a shortage in the required overall braking force $F_{SUM}^*$ that cannot be covered by the regenerative braking force $F_{RG}$, namely, the hydraulic braking force $F_{HY}$ and the electric braking force $F_{EM}$ cover the insufficient braking force $F_{IS}$. Further, the hydraulic braking force $F_{HY}$ and the electric braking force $F_{EM}$ are generated at the set distribution ratio ($\beta_{HY}$:$\beta_{EM}$). In other words, the regenerative braking force $F_{RG}$, the hydraulic braking force $F_{HY}$, and the electric braking force $F_{EM}$ cooperate as described above in the brake system of the present embodiment.

iii) Variation of Hydraulic Braking Force and Variation of Electric Braking Force The hydraulic braking force $F_{HY}$ and the electric braking force $F_{EM}$ may vary or fluctuate due to an environment in which the vehicle is placed and conditions of constituent components of the hydraulic brake device 32 and the electric brake device 34. For instance, when the vehicle is placed in a low-temperature environment, the temperature of the working fluid is lowered and the viscosity of the working fluid is accordingly increased. In this case, the response of the hydraulic braking force $F_{HY}$ is deteriorated, and the hydraulic braking force $F_{HY}$ becomes smaller than the required hydraulic braking force $F_{HY}^*$ to some extent in the process of increase of the hydraulic braking force $F_{HY}$. When the vehicle is running in a high-altitude area, the pressure of the working fluid in the reservoir 48 is lowered, so that the hydraulic braking force $F_{HY}$ becomes smaller than the required hydraulic braking force $F_{HY}^*$ to some extent in the process of increase of the hydraulic braking force $F_{HY}$. For instance, due to a delay of increasing of the hydraulic braking force $F_{HY}$, the hydraulic braking force $F_{HY}$ decreases in the process of increase thereof such as when the brake operation is started or when the vehicle running speed v becomes lower than the threshold speed $v_0$, as shown in FIG. 6A.

Figure 7A:
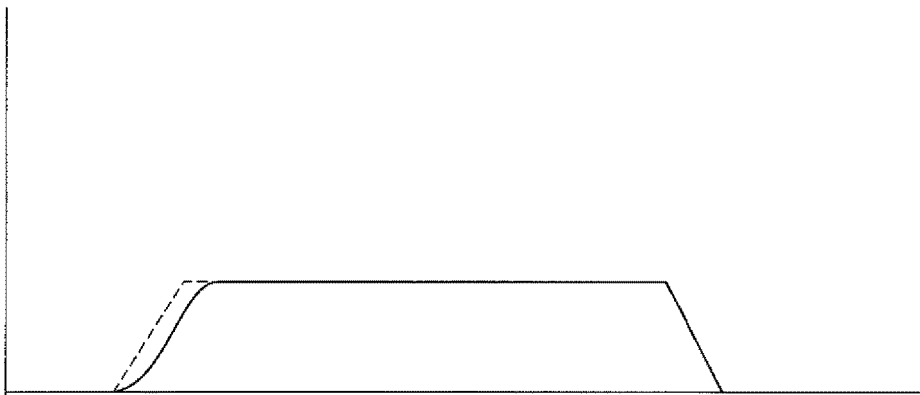
FIG. 7A is a graph showing a variation of the electric braking force and FIGS. 7B and 7C are graphs each showing that the hydraulic braking force is changed to cope with the variation.

When the temperature of the electric motor 114 of the electric brake device 34 rises, a protection circuit works so as to reduce a supply current to the electric motor 114. Further, when a state of charge (SOC) of an auxiliary battery 124 for supplying an electric current to the electric motor 114 is lowered and the voltage of the auxiliary battery 124 is accordingly lowered, the supply current to the electric motor 114 is reduced. In an instance where the supply current to the electric motor 114 is reduced, the movement speed of the plunger 108 becomes low and the electric braking force $F_{EM}$ accordingly becomes smaller than the required electric braking force $F_{EM}{}^*$ to some extent. For instance, due to a delay of increasing of the electric braking force $F_{EM}$, the electric braking force $F_{EM}$ decreases in the process of increase thereof, namely, when the brake operation is started, as shown in FIG. 7A. In each wheel brake 100, the external thread of the threaded rod 110 and the internal thread of the nut 112 are held in engagement with each other, and therefore a difference between positive efficiency (forward efficiency) and negative efficiency (reverse efficiency) is large. Thus, even if the supply current to the electric motor 114 is reduced, the electric braking force $F_{EM}$ in the stationary state does not decrease.

iv) Measures for Coping with Decrease of Hydraulic Braking Force and Decrease of Electric Braking Force The present vehicle brake system, if personified, identifies factors responsible for the variation of the hydraulic braking force $F_{HY}$ and the variation of the electric braking force $F_{EM}$, namely, factors responsible for the decreases of the hydraulic braking force $F_{HY}$ and the decrease of the electric braking force $F_{EM}$, and estimates that the vehicle is in a situation in which one of the hydraulic braking force $F_{HY}$ and the electric braking force $F_{EM}$ varies, namely, decreases. Further, the present brake system changes, based on the estimation, the other of the hydraulic braking force $F_{HY}$ and the electric braking force $F_{EM}$. In other words, in a braking-force insufficient situation in which one of the hydraulic braking force $F_{HY}$ and the electric braking force $F_{LM}$ is insufficient, the present brake system copes with the situation.

As shown in FIG. 1, the present brake system is equipped with an environmental temperature sensor 134 for detecting an environmental temperature $T_E$ which is a temperature of an environment in which the vehicle is placed, an atmospheric pressure sensor 136 for detecting an atmospheric pressure $P_A$, and a battery voltage sensor 138 for detecting a battery voltage $V_B$ which is an output voltage of the auxiliary battery 124. As shown in FIG. 3B, the present brake system is further equipped with motor temperature sensors 140 each for detecting a motor temperature $T_M$ which is a temperature of the electric motor 114 of each wheel brake 100 of the electric brake device 34. Based on detected values of these sensors 134, 136, 138, 140, a hydraulic braking force change gradient $\Delta F_{HY}$ which is a gradient of change of the required hydraulic braking force $F_{HY}{}^*$, and an electric braking force change gradient $\Delta F_{EM}$ which is a gradient of change of the required electric braking force $F_{EM}{}^*$, there are estimated a hydraulic braking force decrease amount $dF_{HY}$ which is an amount of decrease of the hydraulic braking force $F_{HY}$ and an electric braking force decrease amount $dF_{EM}$ which is an amount of decrease of the electric braking force $F_{EM}$. Here, the hydraulic braking force change gradient $\Delta F_{HY}$ may be considered as a speed of increase of the required hydraulic braking force $F_{HY}{}^*$ in the process of increase thereof, and the electric braking force change gradient $\Delta F_{EM}$ may be considered as a speed of increase of the required electric braking force $F_{EM}{}^*$ in the process of increase thereof. Further, the hydraulic braking force decrease amount $dF_{HY}$ may be considered as an insufficient amount with respect to the required hydraulic braking force $F_{HY}{}^*$, and the electric braking force decrease amount $dF_{EM}$ may be considered as an insufficient amount with respect to the required electric braking force $F_{EM}{}^*$.

Figure 8:
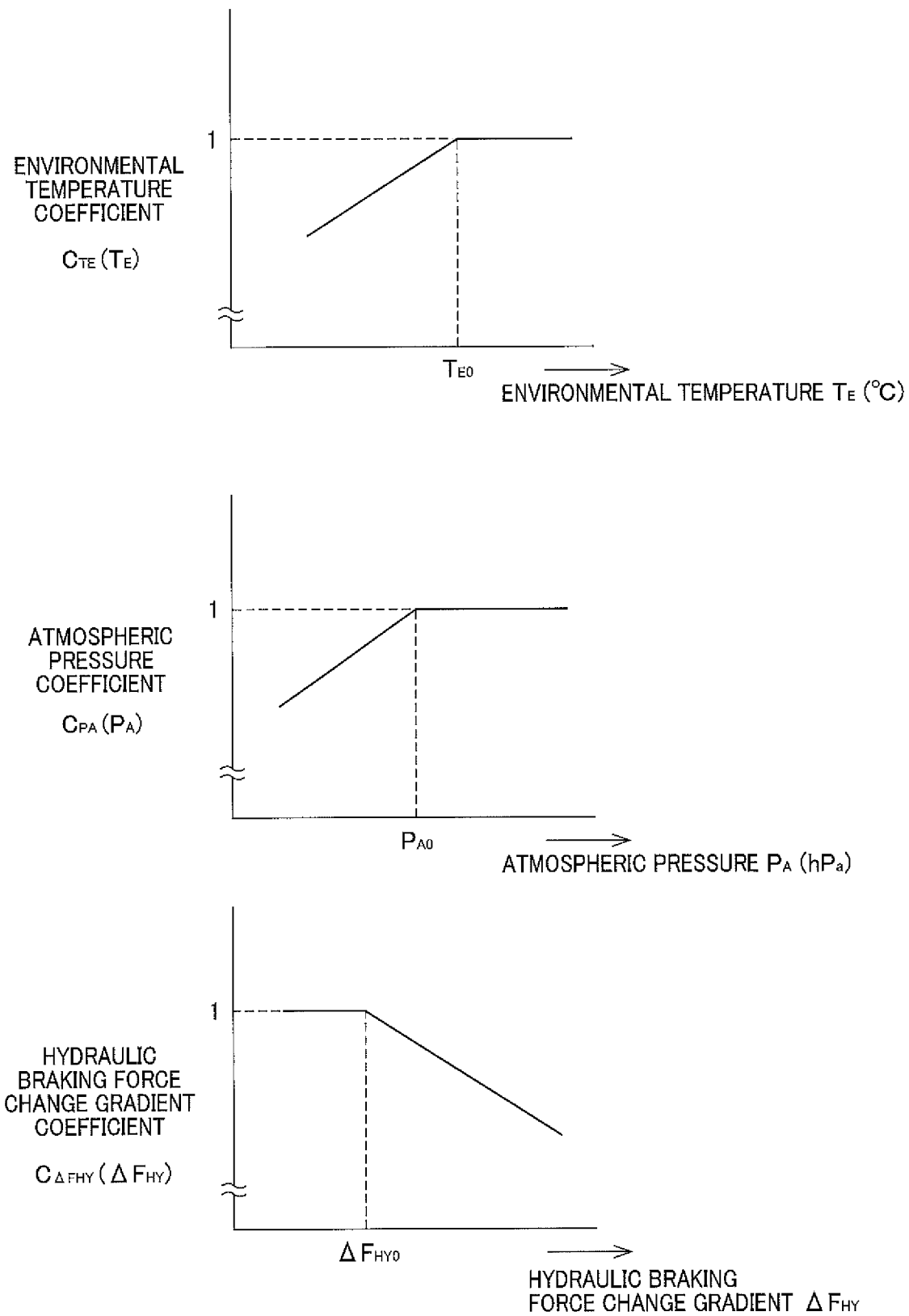
FIG. 8 shows graphs respectively indicating an environmental temperature coefficient, an atmospheric pressure coefficient, and a hydraulic braking force change gradient coefficient which are used for estimating a decrease amount of the hydraulic braking force.

As shown in the graphs of FIG. 8, an environmental temperature coefficient $C_{TE}(T_E)$ which uses the environmental temperature $T_E$ as a parameter, an atmospheric pressure coefficient $C_{PA}(P_A)$ which uses the atmospheric pressure $P_A$ as a parameter, and a hydraulic braking force change gradient coefficient $C_{\Delta FHY}(\Delta F_{HY})$ which uses the hydraulic braking force change gradient $\Delta F_{HY}$ as a parameter are set as data in the form of map. These coefficients are obtained referring to the data, based on the detected or obtained environmental temperature $T_E$, atmospheric pressure $P_A$, and hydraulic braking force change gradient $\Delta F_{HY}$. The environmental temperature coefficient $C_{TE}(T_E)$, the atmospheric pressure coefficient $C_{PA}(P_A)$, and the hydraulic braking force change gradient coefficient $C_{\Delta FHY}(\Delta F_{HY})$ are multiplied by the required hydraulic braking force $F_{HY}{}^*$. Further, a difference obtained by subtracting the thus obtained multiplication product from the required hydraulic braking force $F_{HY}{}^*$ is estimated as the hydraulic braking force decrease amount $dF_{HY}$. As apparent from FIG. 8, the environmental temperature coefficient $C_{TE}(T_E)$ is set to a value smaller than 1 when the environmental temperature $T_E$ is lower than a threshold temperature $T_{E0}$ (e.g., 5° C.), and the atmospheric pressure coefficient $C_{PA}(P_A)$ is set to a value smaller than 1 when the atmospheric pressure $P_A$ is lower than a threshold pressure $P_{A0}$ (e.g., 1 hPa). Thus, when the environmental temperature $T_E$ is lower than the threshold temperature $T_{E0}$ and when the atmospheric pressure $P_A$ is lower than the threshold pressure $P_{A0}$, it is regarded in the present brake system that factors responsible for the decrease of the hydraulic braking force $P_{HY}$ exist. It is noted that it becomes more difficult for the hydraulic braking force $F_{HY}$ to follow an increase of the required hydraulic braking force $F_{HY}{}^*$ as the hydraulic braking force change gradient $\Delta F_{HY}$ becomes larger. In view of this, the hydraulic braking force change gradient coefficient $C_{\Delta FHY}(\Delta F_{HY})$ is set to the value smaller than 1 when it exceeds the threshold gradient $\Delta F_{HY0}$.

Figure 9:
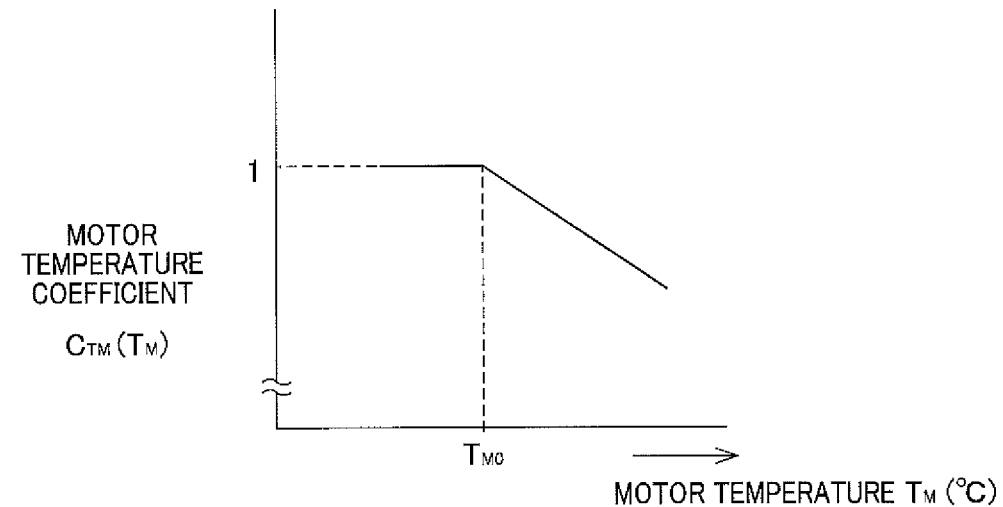
FIG. 9 shows graphs respectively indicating a motor temperature coefficient, a battery voltage coefficient, and an electric braking force change gradient coefficient which are used for estimating a decrease amount of the electric braking force.
Figure 9:
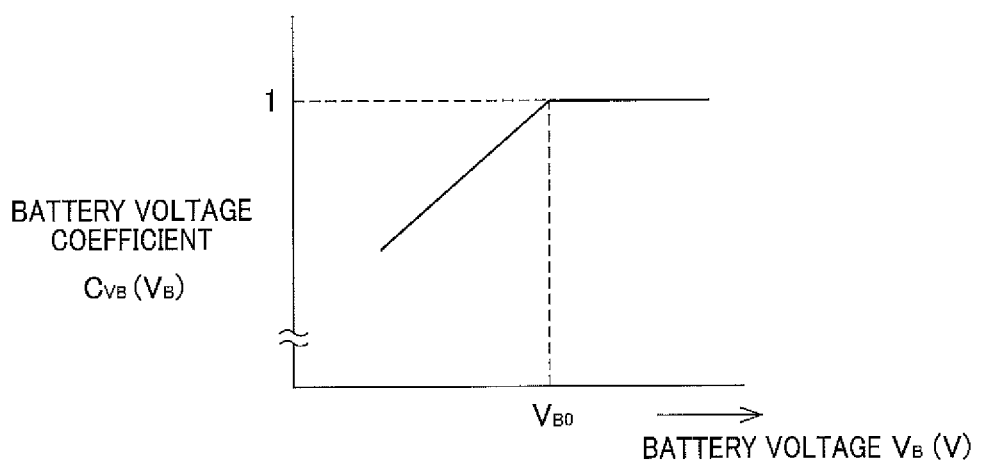
Figure 9:
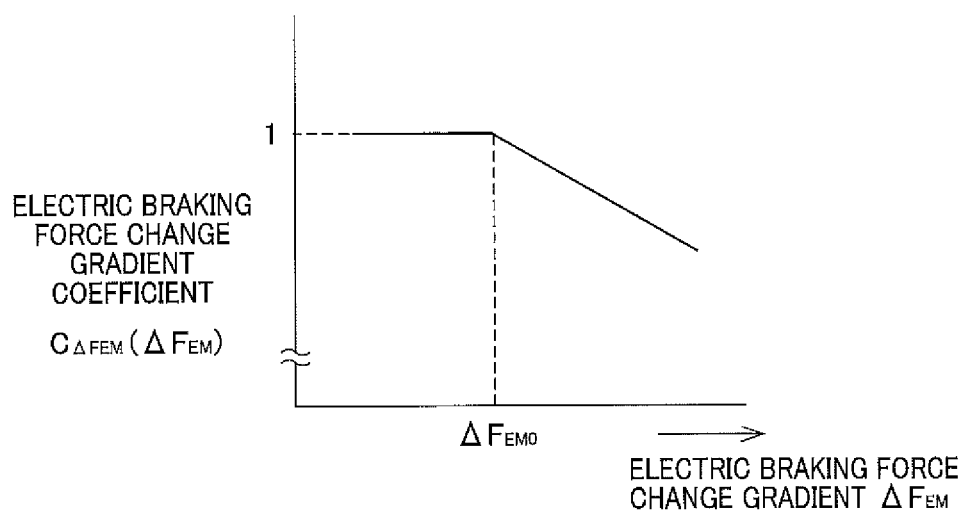

As shown in the graphs of FIG. 9, a motor temperature coefficient $C_{TM}(T_M)$ which uses the motor temperature $T_M$ as a parameter, a battery voltage coefficient $C_{VB}(V_B)$ which uses the battery voltage $V_B$ as a parameter, and an electric braking force change gradient coefficient $C_{\Delta FEM}(\Delta F_{EM})$ which uses the electric braking force change gradient $\Delta F_{EM}$ as a parameter are set as data in the form of map. These coefficients are obtained referring to the data, based on the detected or obtained motor temperature $T_M$, battery voltage $V_B$, and electric braking force change gradient $\Delta F_{EM}$. The motor temperature coefficient $C_{TM}(T_M)$, the battery voltage coefficient $C_{VB}(V_B)$, and the electric braking force change gradient coefficient $C_{\Delta FEM}(\Delta F_{EM})$ are multiplied by the required electric braking force $F_{EM}{}^*$. Further, a difference obtained by subtracting the thus obtained multiplication product from the required electric braking force $F_{EM}{}^*$ is estimated as the electric braking force decrease amount $dF_{EM}$. As apparent from FIG. 9, the motor temperature coefficient $C_{TM}(T_M)$ is set to a value smaller than 1 when the motor temperature $T_M$ is higher than a threshold temperature $T_{M0}$ (e.g., 50° C.), and the battery voltage coefficient $C_{VB}(V_B)$ is set to a value smaller than 1 when the battery voltage $V_B$ is lower than a threshold voltage $V_{B0}$ (e.g., 11 V). Thus, when the motor temperature $T_M$ is higher than the threshold temperature $T_{M0}$ and when the battery voltage $V_B$ is lower than the threshold voltage $V_{B0}$, it is regarded in the present brake system that factors responsible for the decrease of the electric braking force $F_{EM}$ exist. It is noted that it becomes more difficult for the electric braking force $F_{FM}$ to follow an increase of the required electric braking force $F_{EM}{}^*$ as the electric braking force change gradient $\Delta F_{EM}$ becomes larger. In view of this, the electric braking force change gradient coefficient $C_{\Delta FEM}(\Delta F_{EM})$ is set to the value smaller than 1 when it exceeds the threshold gradient $\Delta F_{EM0}$.

The required electric braking force $F_{EM}^*$ and the required hydraulic braking force $F_{HY}^*$ are respectively changed based on the thus estimated hydraulic braking force decrease amount $dF_{HY}$ and electric braking force decrease amount $dF_{EM}$, so that the required electric braking force $F_{EM}^*$ and the required hydraulic braking force $F_{HY}^*$ are corrected. The correction is performed in a selected one of two modes, i.e., a supplementing mode and a balance mode.

Figure 6B:
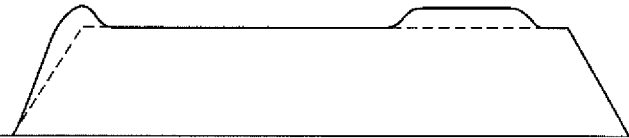
Figure 7B:
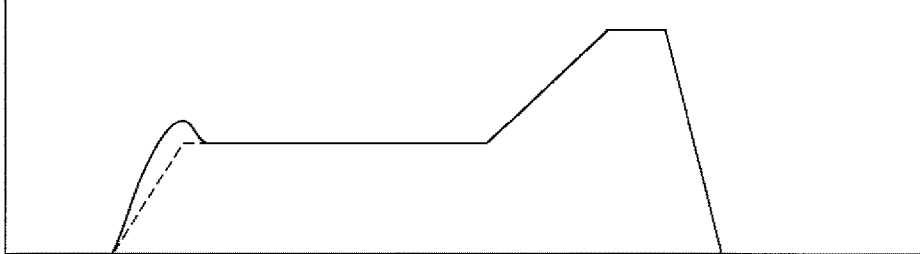

In the supplementing mode, when it is estimated that the hydraulic braking force $F_{HY}$ decreases, the required electric braking force $F_{EM}^*$ is increased by the hydraulic braking force decrease amount $dF_{HY}$, as shown in FIG. 6B. Further, when it is estimated that the electric braking force $F_{EM}$ decreases, the required hydraulic braking force $F_{HY}^*$ is increased by the electric braking force decrease amount $dF_{EM}$, as shown in FIG. 7B. In the supplementing mode, the decrease of the hydraulic braking force $F_{HY}$ and the decrease of the electric braking force $F_{EM}$ are supplemented, so that it is possible to reduce or avoid a decrease of the overall braking force $F_{SUM}$ due to the decreases of the hydraulic braking force $F_{HY}$ and the electric braking force $F_{EM}$.

Figure 6C:
Figure 7C:
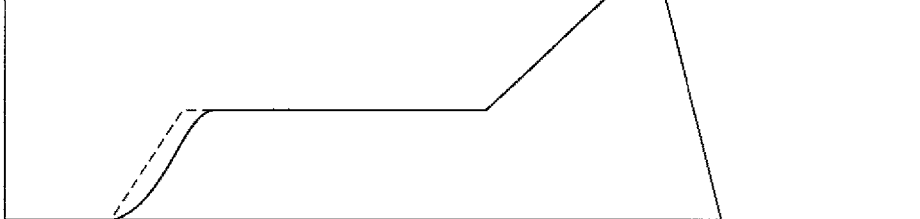

In the balance mode, when it is estimated that the hydraulic braking force $F_{HY}$ decreases, the required electric braking force $F_{EM}^*$ is decreased by an amount corresponding to the hydraulic braking force decrease amount $dF_{HY}$, as shown in FIG. 6C. Specifically, a multiplication product, which is obtained by multiplying the hydraulic braking force decrease amount $dF_{HY}$ by a ratio $(\beta_{EM}/\beta_{HY})$ of the electric braking force distribution coefficient $\beta_{EM}$ with respect to the hydraulic braking force distribution coefficient $\beta_{HY}$, is subtracted from the required electric braking force $F_{EM}^*$. When it is estimated that the electric braking force $F_{EM}$ decreases, the required hydraulic braking force $F_{HY}^*$ is decreased by an amount corresponding to the electric braking force decrease amount $dF_{EM}$, as shown in FIG. 7C. Specifically, a multiplication product, which is obtained by multiplying the electric braking force decrease amount $dF_{EM}$ by a ratio $(\beta_{HY}/\beta_{EM})$ of the hydraulic braking force distribution coefficient $\beta_{HY}$ with respect to the electric braking force distribution coefficient $\beta_{EM}$, is subtracted from the required hydraulic braking force $F_{HY}^*$. In the balance mode, it is possible to reduce or avoid a change in the distribution of the braking force F to the front wheel 10F and the rear wheel 10R, thereby reducing or avoiding a change in the feeling of the brake operation as felt by the driver.

In the present brake system, it is estimated that the factors responsible for the variations of the hydraulic braking force $F_{HY}$ and the electric braking force $F_{EM}$ exist without actually detecting the variations, and the electric braking force $F_{EM}$ and the hydraulic braking force $F_{HY}$ are changed in accordance with the degrees of the factors. That is, the present brake system easily copes with the variations of the hydraulic braking force $F_{HY}$ and the electric braking force $F_{EM}$.

v) Control Flow

Figure 10:
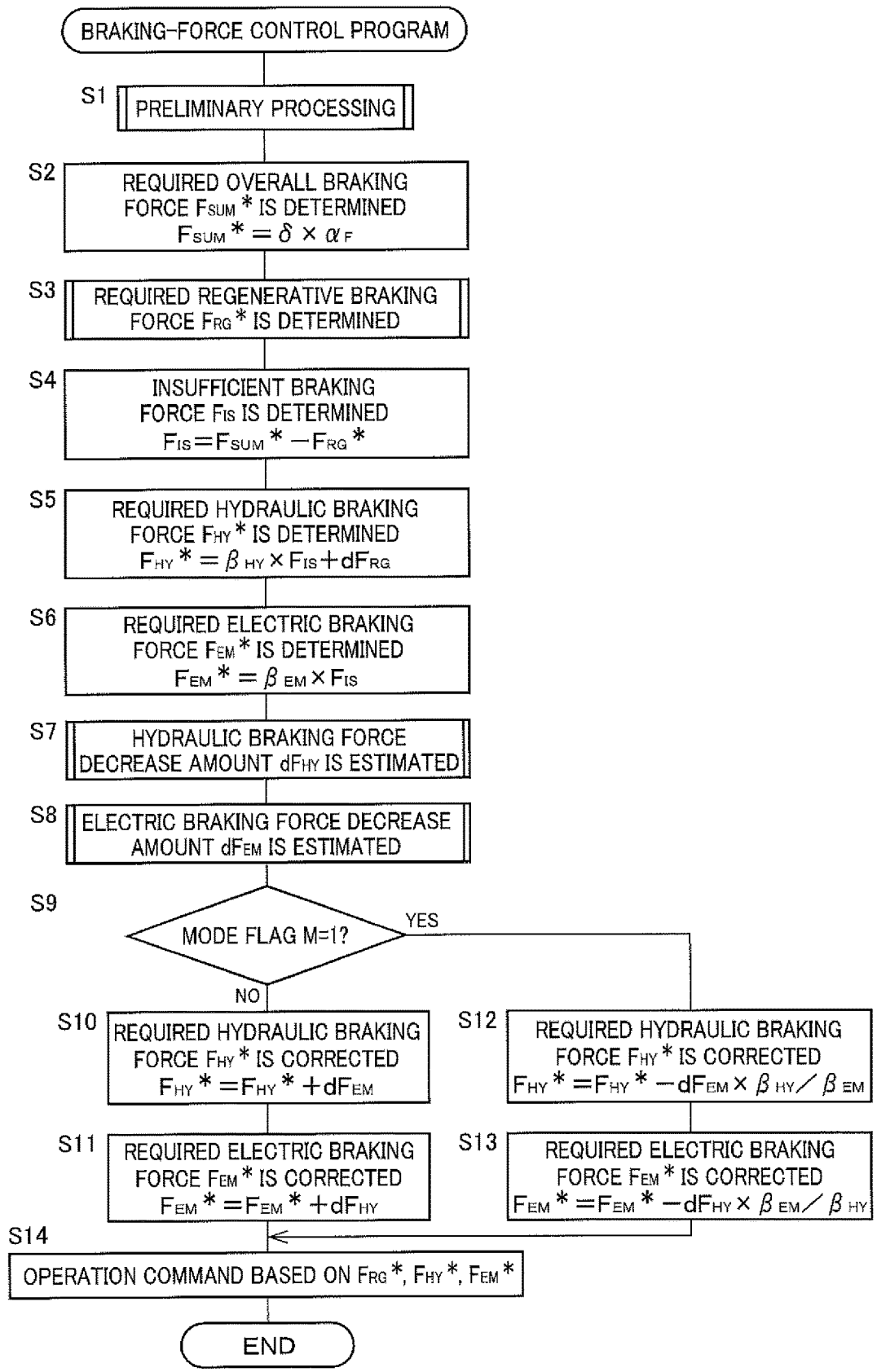
FIG. 10 is a flowchart showing a braking-force control program executed in the vehicle brake system of the first embodiment.

The present vehicle brake system is controlled such that a computer of the ECU 130 repeatedly executes a braking-force control program shown by a flowchart of FIG. 10 at a short time pitch from several μsecs to several msecs, for instance. The flow of control of the braking force in the present brake system will be hereinafter explained based on explanation of processing according to the control program.

Figure 11:
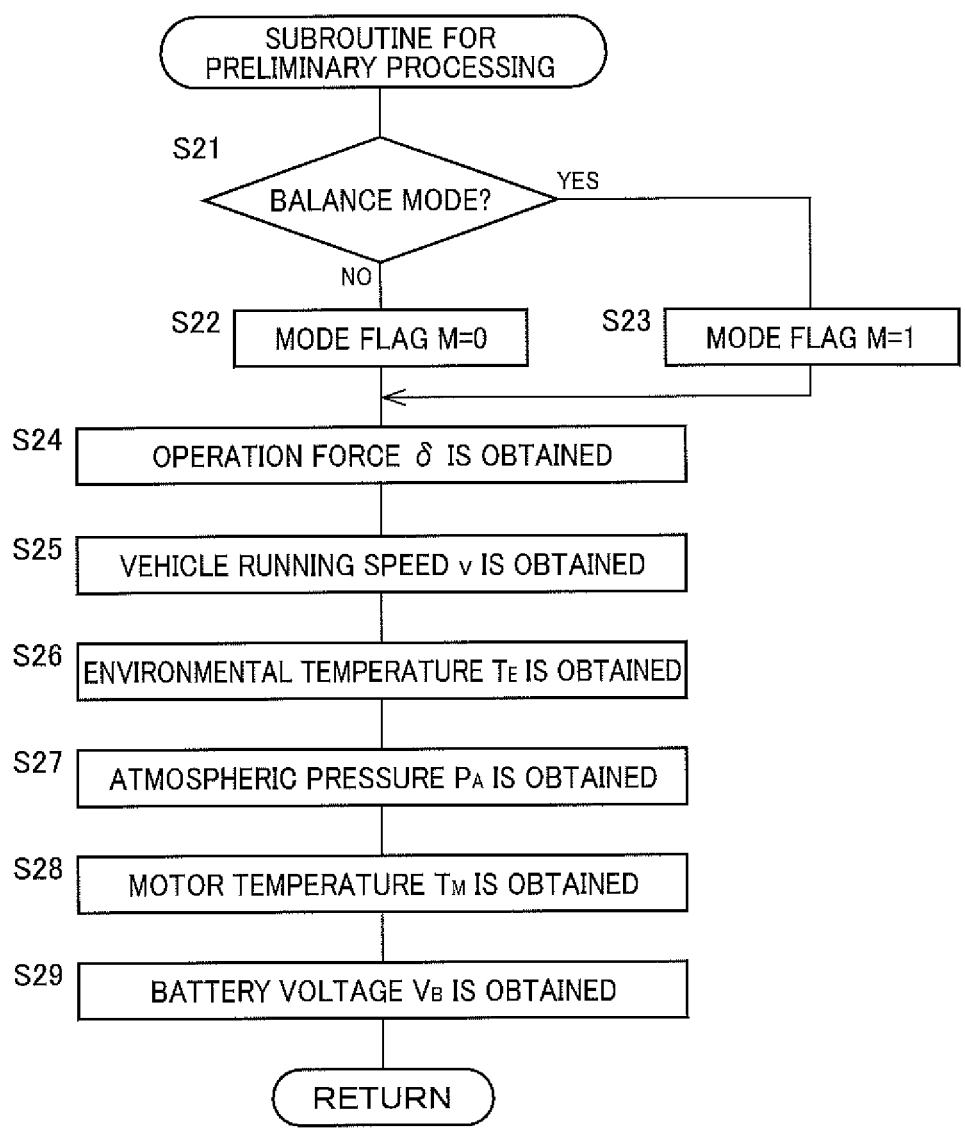
FIG. 11 is a flowchart showing a subroutine for a preliminary processing in the braking-force control program of FIG. 10.

In the processing according to the braking-force control program, a preliminary processing is initially executed at Step 1. (Hereinafter, Step 1 is abbreviated as "S1" and other steps are similarly abbreviated.) The preliminary processing is executed by execution of a subroutine for the preliminary processing indicated by a flowchart of FIG. 11. In the preliminary processing, it is initially determined at S21 which one of the two modes is being selected in relation to correction of the hydraulic braking force $F_{HY}$ and the electric braking force $F_{EM}$. While not illustrated, a mode selecting switch to be operated by the driver is provided on an instrument panel of the vehicle. The determination at S21 is made based on the state of the switch. When the supplementing mode is being selected, a mode flag M is set to "0" at S22. When the balance mode is being selected, the mode flag M is set to "1" at S23. Subsequently, at S24, the operation force δ that is being applied to the brake pedal 40 is obtained based on the detected value of the operation force sensor 132. At S25 to S29, the vehicle running speed v is obtained based on the detected value of the vehicle speed sensor 142 (FIG. 1), the environmental temperature $T_E$ is obtained based on the detected value of the environmental temperature sensor 134, the atmospheric pressure $P_A$ is obtained based on the detected value of the atmospheric pressure sensor 136, the motor temperature $T_M$ is obtained based on the detected value of the motor temperature sensor 140, and the battery voltage $V_B$ is obtained based on the detected value of the battery voltage sensor 138.

Figure 12:
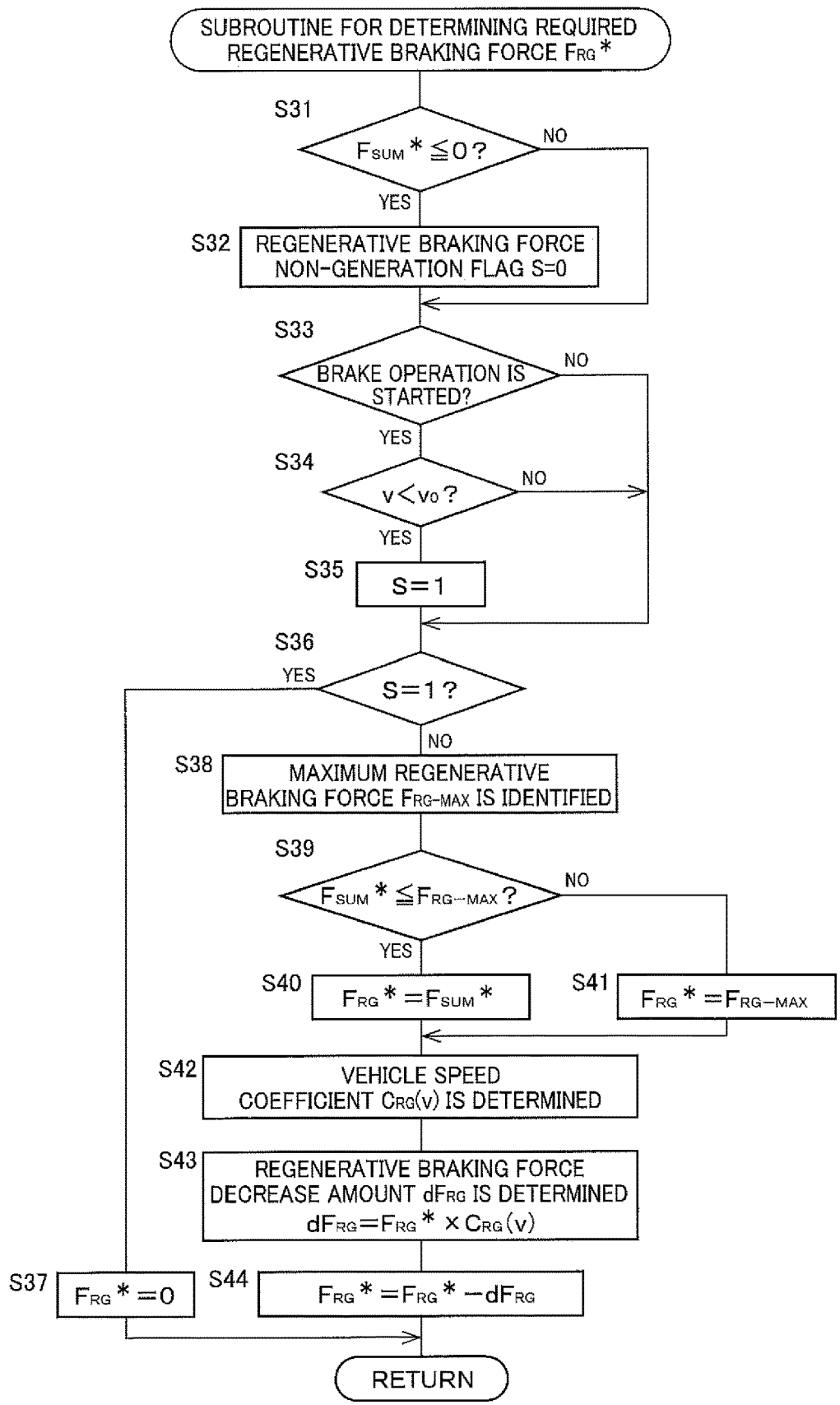
FIG. 12 is a flowchart showing a subroutine for determining a required regenerative braking force in the braking-force control program of FIG. 10.

After the preliminary processing has been executed, the required overall braking force $F_{SUM}^*$ is determined at S2 by multiplying the obtained operation force δ by the set braking force coefficient $\alpha_F$. Subsequently, at S3, the required regenerative braking force $F_{RG}^*$ is determined based on the determined required overall braking force $F_{SUM}^*$, prior to determination of the required hydraulic braking force $F_{HY}^*$ and the required electric braking force $F_{EM}^*$. Processing for determining the required regenerative braking force $F_{RG}^*$ is executed by execution of a subroutine for determining the required regenerative braking force indicated by a flowchart of FIG. 12.

In the processing according to the subroutine for determining the required regenerative braking force, it is initially determined at S31 whether or not the determined required overall braking force $F_{SUM}^*$ is equal to or smaller than 0. A state in which the required overall braking force $F_{SUM}^*$ is equal to 0 means a state in which the brake operation is not performed. When the brake operation is not performed, a regenerative braking force non-generation flag S is reset at S32. The regenerative braking force non-generation flag is set to "1" when the regenerative braking force $F_{RG}$ is not required to be generated.

It is subsequently determined at S33 whether the brake operation is started. Specifically, it is determined that the brake operation is started when the brake operation is not performed before current execution of the program and the brake operation is performed by current execution of the program. When it is determined that the brake operation is started, it is determined at S34 whether or not the vehicle running speed v at the present moment is lower than the threshold speed $v_0$. When it is determined that the vehicle running speed v is lower than the threshold speed $v_0$, the regenerative braking force non-generation flag is set to "1" at S35, and it is determined at S36 that the value of the regenerative braking force non-generation flag is "1". Subsequently, at S37, the required regenerative braking force $F_{RG}^*$ is determined to be equal to 0, and the regenerative braking force $F_{RG}$ is controlled not to be generated in a current series of the brake operation. On the other hand, when it is determined that the vehicle running speed v is equal to or higher than the threshold speed $v_0$, the value of the regenerative braking force non-generation flag is kept at "0", and an appropriate regenerative braking force $F_{RG}$ is generated in the current series of the brake operation by processing at S38 and its subsequent steps.

The processing at S38 and its subsequent steps will be explained. At S38, the maximum regenerative braking force $F_{RG-MAX}$, which is the regenerative braking force $F_{RG}$ that can be generated at the present moment, is identified based on the state of charge (SOC) of the battery 28, the vehicle ruining speed v, and so on. It is subsequently determined at S39 whether or not the required overall braking force $F_{SUM}*$ is equal to or smaller than the maximum regenerative braking force $F_{RG-MAX}$. When the required overall braking force $F_{SUM}*$ is equal to or smaller than the maximum regenerative braking force $F_{RG-MAX}$, the required overall braking force $F_{SUM}$ can be covered by the regenerative braking force $F_{RG}$. In this case, the required regenerative braking force $F_{RG}*$ is determined to be equal to the required overall braking force $F_{SUM}*$ at S40. On the other hand, when the required overall braking force $F_{SUM}*$ exceeds the maximum regenerative braking force $F_{RG-MAX}$, the required regenerative braking force $F_{RG}*$ is determined to be equal to the maximum regenerative braking force $F_{RG-MAX}$ at S41, so as to generate the regenerative braking force $F_{RG}$ as large as possible.

When the vehicle decelerates as a result of progress of the brake operation and the vehicle running speed v accordingly becomes lower than the threshold speed $v_0$, there is executed correction processing of the required regenerative braking force $F_{RG}*$ for replacing the regenerative braking force $F_{RG}$ with the hydraulic braking force $F_{HY}$. In the correction processing, the vehicle speed coefficient $C_{RG}(v)$ in accordance with the vehicle running speed v is identified at S42 referring to the map data of FIG. 4. Subsequently, the regenerative braking force decrease amount $dF_{RG}$ is determined at S43 by multiplying the required regenerative braking force $F_{RG}*$ by the vehicle speed coefficient $C_{RG}(v)$. At S44, the determined regenerative braking force decrease amount $dF_{RG}$ is subtracted from the required regenerative braking force $F_{RG}*$, whereby the required regenerative braking force $F_{RG}*$ is corrected.

After the required regenerative braking force $F_{RG}*$ is determined by the processing according to the subroutine for determining the required regenerative braking force, the insufficient braking force $F_{IS}$ is determined at S4 by subtracting the required regenerative braking force $F_{RG}*$ from the required overall braking force $F_{SUM}*$. Subsequently, at S5, the insufficient braking force $F_{is}$ is multiplied by the hydraulic braking force distribution coefficient $\beta_{HY}$, and the regenerative braking force decrease amount $dF_{RG}$ is added to the obtained multiplication product, whereby the required hydraulic braking force $F_{HY}*$ is determined. By multiplying the insufficient braking force $F_{IS}$ by the electric braking force distribution coefficient $\beta_{EM}$, the required electric braking force $F_{EM}*$ is determined at S6.

Figure 13A:
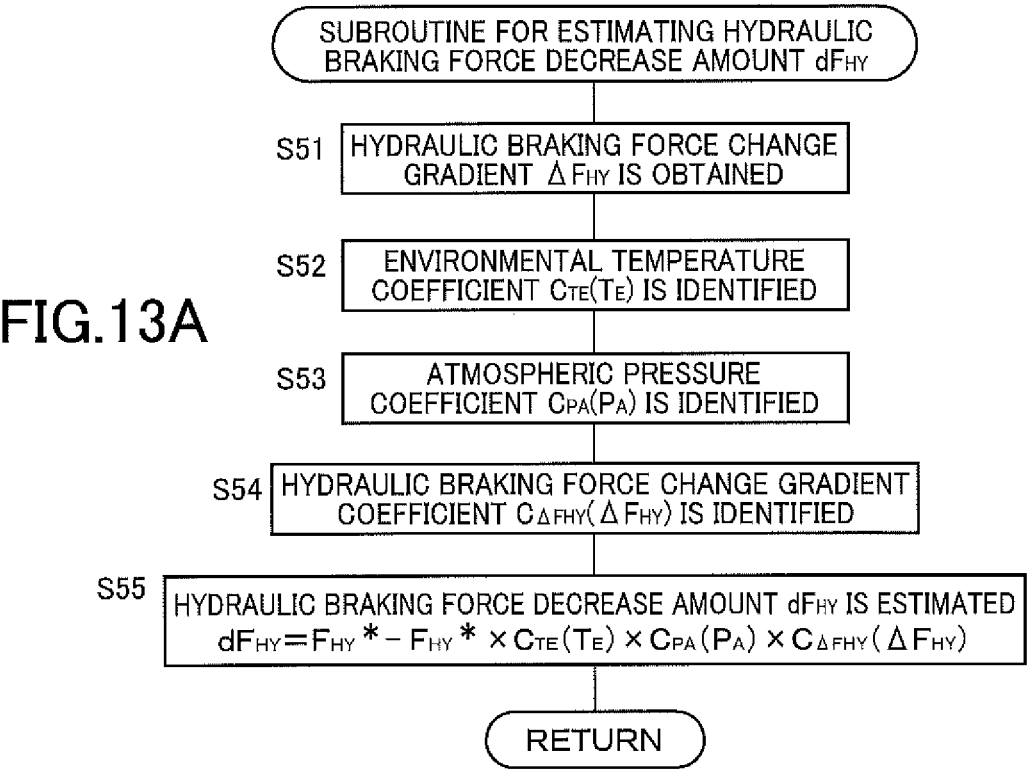
FIG. 13A is a flowchart showing a subroutine for estimating a hydraulic braking force decrease amount and FIG. 13B is a flowchart showing a subroutine for estimating an electric braking force decrease amount, in the braking-force control program of FIG. 10.

At S7, in consideration of the decrease of the hydraulic braking force $F_{HY}$ due to the presence of the factors mentioned above, the hydraulic braking force decrease amount $dF_{HY}$ is estimated as a shortage of the hydraulic braking force $F_{HY}$ that would be actually generated, with respect to the required hydraulic braking force $F_{HY}*$. The estimation is performed by executing a subroutine for estimating the hydraulic braking force decrease amount indicated by a flowchart of FIG. 13A. In processing according to the subroutine, the hydraulic braking force change gradient $\Delta F_{HY}$ is initially obtained at S51 based on a difference between the required hydraulic braking force $F_{HY}*$ in previous execution of the program (i.e., the required hydraulic braking force $F_{HY}*$ determined at S5 in previous execution) and the required hydraulic braking force $F_{HY}*$ in current execution of the program. At S52 to S54, the environmental temperature coefficient $C_{TE}(T_E)$, the atmospheric pressure coefficient $C_{PA}(P_A)$, and the hydraulic braking force change gradient coefficient $C_{\Delta FHY}(\Delta F_{HY})$ are identified respectively based on the environmental temperature $T_E$, the atmospheric pressure $P_A$, and the hydraulic braking force change gradient $\Delta F_{HY}$ by referring to the map data shown in FIG. 8. At S55, the hydraulic braking force decrease amount $dF_{HY}$ is estimated in the following manner. The identified environmental temperature coefficient $C_{TE}(T_E)$, atmospheric pressure coefficient $C_{PA}(P_A)$, and hydraulic braking force change gradient coefficient $C_{\Delta FHY}(\Delta F_{HY})$ are multiplied by the required hydraulic braking force $F_{HY}*$, and a product of the multiplication is subtracted from the required hydraulic braking force $F_{HY}*$. Thus, the hydraulic braking force decrease amount $dF_{HY}$ is estimated.

Figure 13B:
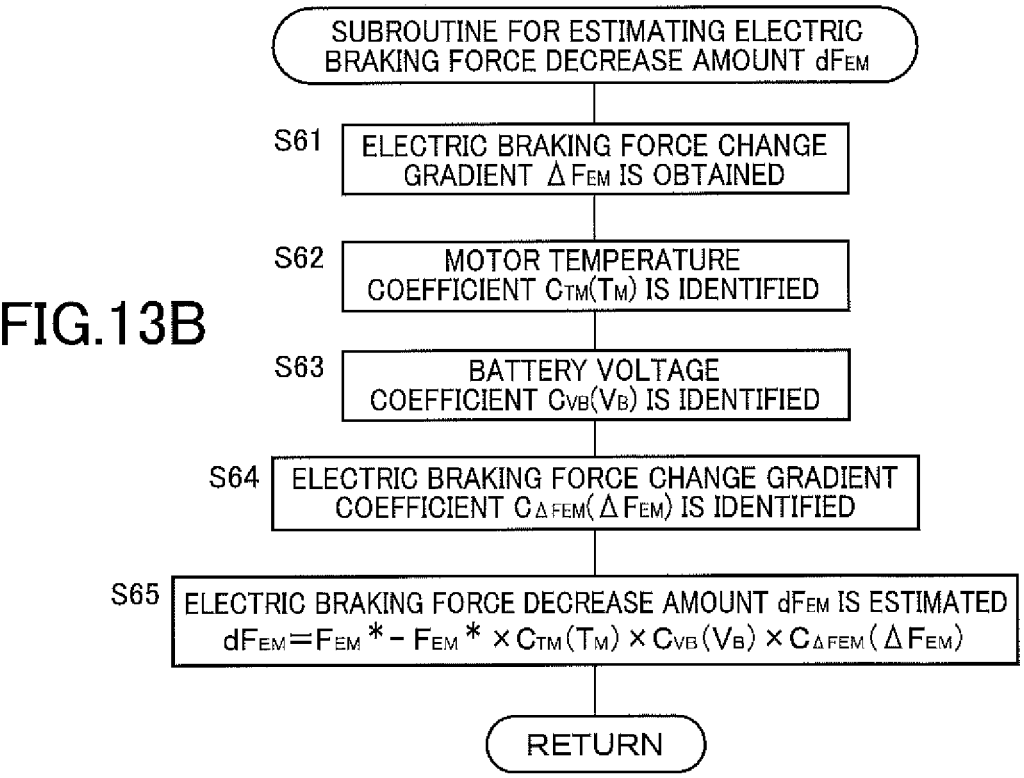

At S8, in consideration of the decrease of the electric braking force $F_{EM}$ due to the presence of the factors mentioned above, the electric braking force decrease amount $dF_{EM}$ is estimated as a shortage of the electric braking force $F_{EM}$ that would be actually generated, with respect to the required electric braking force $F_{BM}*$. The estimation is performed by executing a subroutine for estimating the electric braking force decrease amount indicated by a flowchart of FIG. 13B. In processing according to the subroutine, the electric braking force change gradient $\Delta F_{EM}$ is initially obtained at S61 based on a difference between the required electric braking force $F_{EM}*$ in previous execution of the program (i.e., the required electric braking force $F_{EM}*$ determined at S6 in previous execution) and the required electric braking force $F_{EM}*$ in current execution of the program. At S62 to S64, the motor temperature coefficient $C_{TM}(T_M)$, the battery voltage coefficient $C_{VB}(V_B)$, and the electric braking force change gradient coefficient $C_{\Delta FEM}(\Delta F_{EM})$ are identified respectively based on the motor temperature $T_M$, the battery voltage $V_B$, and the electric braking force change gradient $\Delta F_{EM}$ by referring to the map data shown in FIG. 9. At S65, the electric braking force decrease amount $dF_{EM}$ is estimated in the following manner. The identified motor temperature coefficient $C_{TM}(T_M)$, battery voltage coefficient $C_{VB}(V_B)$, and electric braking force change gradient coefficient $C_{\Delta FEM}(\Delta F_{EM})$ are multiplied by the required electric braking force $F_{EM}*$, and a product of the multiplication is subtracted from the required electric braking force $F_{EM}*$. Thus, the electric braking force decrease amount $dF_{EM}$ is estimated.

Referring back to the flow chart of FIG. 10, it is determined at S9 whether or not the mode flag M is "1", namely, whether a currently selected mode is the supplementing mode or the balance mode. When the supplementing mode is being selected, the electric braking force decrease amount $dF_{EM}$ is added to the required hydraulic braking force $F_{HY}*$ at S10, and the hydraulic braking force decrease amount $dF_{HY}$ is added to the required electric braking force $F_{EM}*$ at S11. Thus, the required hydraulic braking force $F_{HY}*$ and the required electric braking force $F_{EM}*$ are corrected. On the other hand, when the balance mode is being selected, a multiplication product of: the electric braking force decrease amount $dF_{EM}$; and the ratio $\beta_{HY}/\beta_{EM}$ (which is a ratio of the hydraulic braking force distribution coefficient $\beta_H$ to the electric braking force distribution coefficient $\beta_{EM}$) is subtracted from the required hydraulic braking force $F_{HY}*$ at S12. Further, a multiplication product of: the hydraulic braking force decrease amount $dF_{HY}$; and the ratio $\beta_{EM}/\beta_{HY}$ (which is a ratio of the electric braking force distribution coefficient $\beta_{EM}$ to the hydraulic braking force distribution coefficient $\beta_{HY}$) is subtracted from the required electric braking force $F_{EM}^*$ at S13. In this way, the required hydraulic braking force $F_{HY}^*$ and the required electric braking force $F_{EM}^*$ are corrected.

Thereafter, at S14, an operation command based on the thus determined and corrected required regenerative braking force $F_{RG}^*$, required hydraulic braking force $F_{HY}^*$, and required electric braking force $F_{EM}^*$ is issued to the regenerative brake device 30, the hydraulic brake device 32, and the electric brake device 34. Thus, a series of processing according to the program ends.

Embodiment 2

A. Structure of Vehicle Brake System

Figure 14:
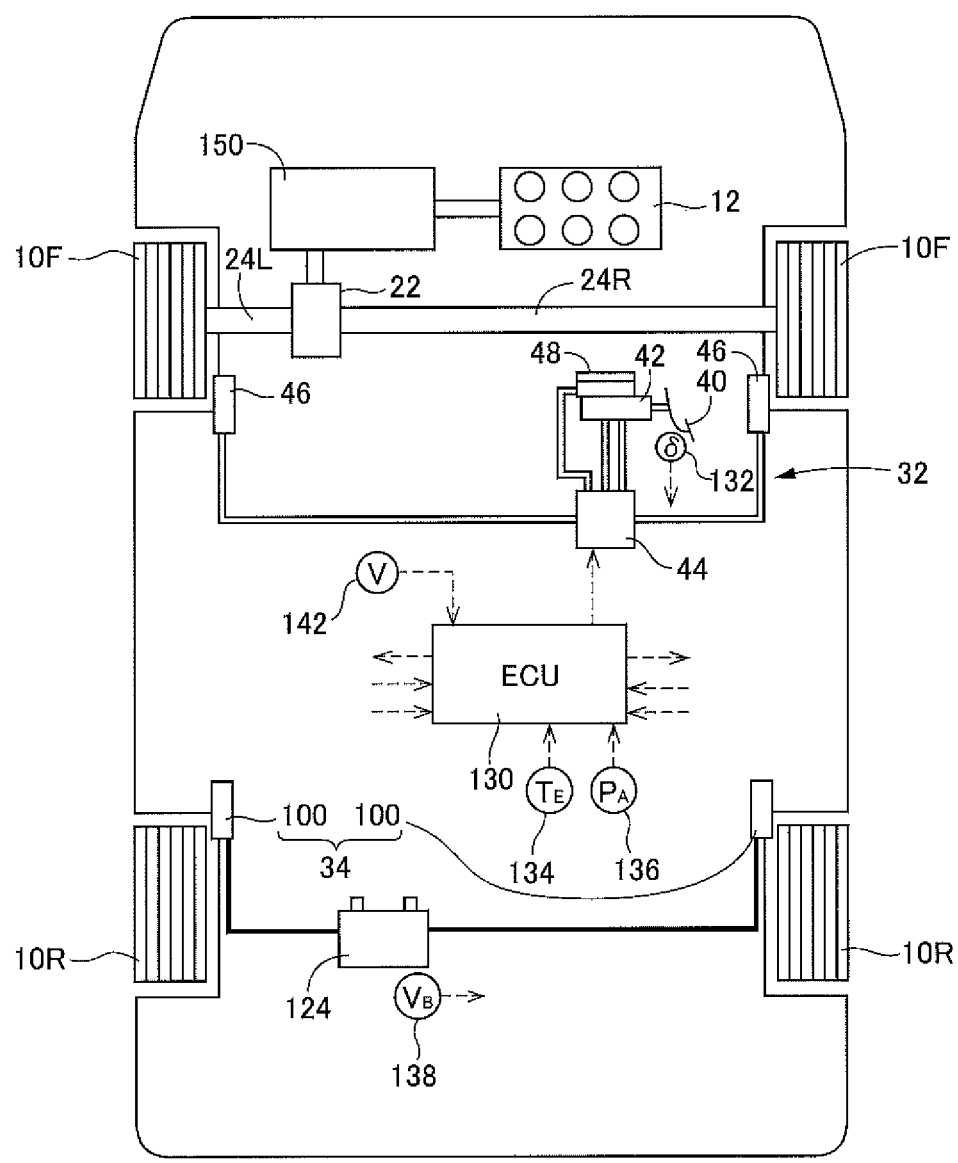
FIG. 14 is a view conceptually showing an overall structure of a vehicle brake system according to a second embodiment.

As shown in FIG. 14, a vehicle on which a brake system according to a second embodiment is installed is not a hybrid vehicle. A vehicle drive system installed on the vehicle of the second embodiment includes the engine 12 as the drive source, a transmission mechanism 150, the differential mechanism 22, and the drive shafts 24L, 24R and is configured to drive the right and left front wheels 10F. The present brake system includes the hydraulic brake device 32 and the electric brake device 34 without including the regenerative brake device. In the following explanation, the same reference numerals as used in the first embodiment are used to identify devices and constituent components of the second embodiment having the same functions as the devices and constituent components of the first embodiment, and a detailed explanation thereof is dispensed with. The vehicle brake system according to this second embodiment also enjoys the advantage of the size reduction of the hydraulic brake device 32 and vehicle brake system, as in the illustrated first embodiment.

The hydraulic brake device 32 and the electric brake device 34 of the second embodiment are almost identical in structure with those of the vehicle brake system of the first embodiment. In the brake system of the second embodiment, the hydraulic brake device 32 is configured to give the hydraulic braking force to the front wheel 10F, and the electric brake device 34 is configured to give the electric braking force to the rear wheel 10R.

B. Control of Vehicle Brake System i) Outline of Control

The control of the braking force F in the present brake system, namely, the control of the hydraulic braking force $F_{HY}$ and the electric braking force $F_{EM}$, is executed by the ECU 130. In the following explanation, processing which is the same as the processing in the control of the vehicle brake system of the first embodiment is not explained.

In the control of the present brake system, the required overall braking force $F_{SUM}^*$ is determined by multiplying the operation force $\delta$ detected by the operation force sensor 132 by the braking force coefficient $\alpha_F$. The determined required overall braking force $F_{SUM}^*$ is distributed into the required hydraulic braking force $F_{HY}^*$ and the required electric braking force $F_{EM}^*$. The distribution is made based on a distribution ratio ($\beta_{HY}:\beta_{EM}$) based on the hydraulic braking force distribution coefficient $\beta_{HY}$ and the electric braking force distribution coefficient $\beta_{EM}$.

As explained above, the hydraulic braking force and the electric braking force may vary or fluctuate due to the environment in which the vehicle is placed, and the conditions of the constituent components of the hydraulic brake device 32 and the electric brake device 34. In the vehicle brake system of the first embodiment, the presence of the factors responsible for the variation is estimated, and the variation of one of the hydraulic braking force $F_{HY}$ and the electric braking force $F_{EM}$ is coped with by changing the other of the hydraulic braking force $F_{HY}$ and the electric braking force $F_{EM}$ in accordance with the degree of the factors. In the brake system of the second embodiment, the variation of the one of the hydraulic braking force $F_{HY}$ and the electric braking force $F_{EM}$ is coped with based on an actually detected braking force F. It is therefore possible in the present brake system to appropriately cope with the variation based on identification of the decrease in an actual braking force, not based on estimation, in other words, irrespective of the presence of the factors responsible for the variation.

Specifically, the decrease of the hydraulic braking force $F_{HY}$ is identified in the following manner. An actual hydraulic braking force $F_{HY}$ is obtained based on a wheel cylinder pressure $P_W$ which is a pressure of the working fluid supplied to the wheel cylinder 84 of the wheel brake 46. When a hydraulic braking force difference $\delta F_{HY}$, which is a difference between the hydraulic braking force $F_{HY}$ and the required hydraulic braking force $F_{HY}^*$, exceeds a threshold difference $\delta F_{HY-TH}$ in the process of increase of the required overall braking force $F_{SUM}^*$, it is identified that the hydraulic braking force $F_{HY}$ is smaller than the required hydraulic braking force $F_{HY}^*$ due to a delay of increasing of the hydraulic braking force $F_{HY}$.

Similarly, the decrease of the electric braking force $F_{EM}$ is identified in the following manner. An actual electric braking force $F_{EM}$ is obtained based on a pushing load W that is applied to the disc rotor 102 by the brake pad 120 of the wheel brake 100. When an electric braking force difference $\delta F_{EM}$, which is a difference between the electric braking force $F_{EM}$ and the required electric braking force $F_{EM}^*$, exceeds a threshold difference $\delta F_{EM-TH}$ in the process of increase of the required overall braking force $F_{SUM}^*$, it is identified that the electric braking force $F_{EM}$ is smaller than the required electric braking force $F_{EM}^*$ due to a delay of increasing of the electric braking force $F_{EM}$.

As in the vehicle brake system of the first embodiment, the decrease of the hydraulic braking force $F_{HY}$ and the decrease of the electric braking force $F_{EM}$ are coped with differently between the supplementing mode and the balance mode. In the supplementing mode, the decrease of the hydraulic braking force $F_{HY}$ is coped with by adding the hydraulic braking force difference $\delta F_{HY}$ to the required electric braking force $F_{EM}^*$, whereby the required hydraulic braking force $F_{HY}^*$ is corrected. In the balance mode, a multiplication product of: the ratio $\beta_{EM}/\beta_{HY}$ (which is a ratio of the electric braking force distribution coefficient $\beta_{EM}$ to the hydraulic braking force distribution coefficient $\beta_{HY}$); and the hydraulic braking force difference $\delta F_{HY}$ is subtracted from the required electric braking force $F_{EM}^*$, whereby the required hydraulic braking force $F_{HY}^*$ is corrected. Similarly, in the supplementing mode, the decrease of the electric braking force $F_{EM}$ is coped with by adding the electric braking force difference $\delta F_{EM}$ to the required hydraulic braking force $F_{HY}^*$, whereby the required electric braking force $F_{EM}^*$ is corrected. In the balance mode, a multiplication product of: the ratio $\beta_{HY}/\beta_{EM}$ (which is a ratio of the hydraulic braking force distribution coefficient $\beta_{HY}$ to the electric braking force distribution coefficient $\beta_{EM}$); and the electric braking force difference $\delta F_{EM}$ is subtracted from the required hydraulic braking force $F_{HY}^*$, whereby the required electric braking force $F_{EM}^*$ is corrected.

Figure 15A:
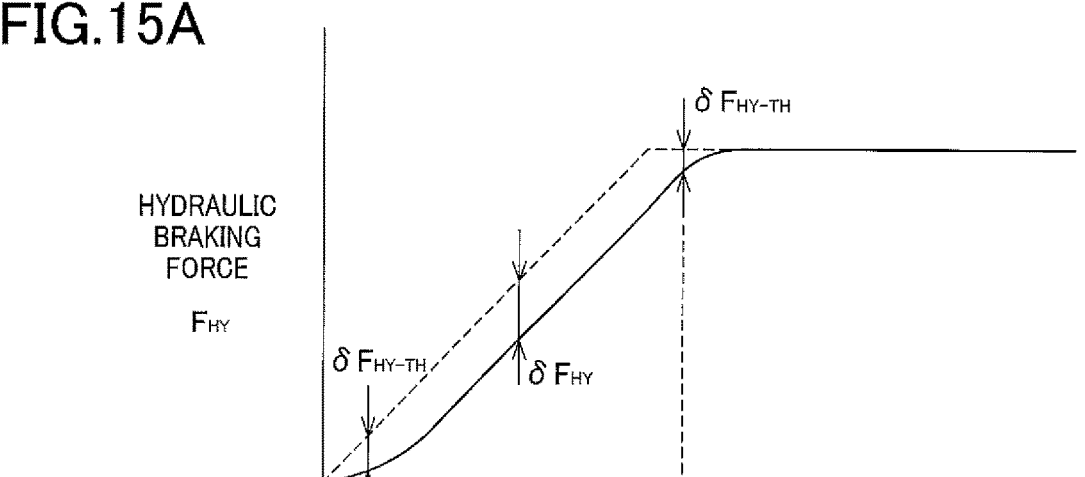
FIG. 15A is a graph showing a variation of the hydraulic braking force that is detected and FIGS. 15B and 15C are graphs each showing that the electric braking force is changed to cope with the detected variation.
Figure 15B:
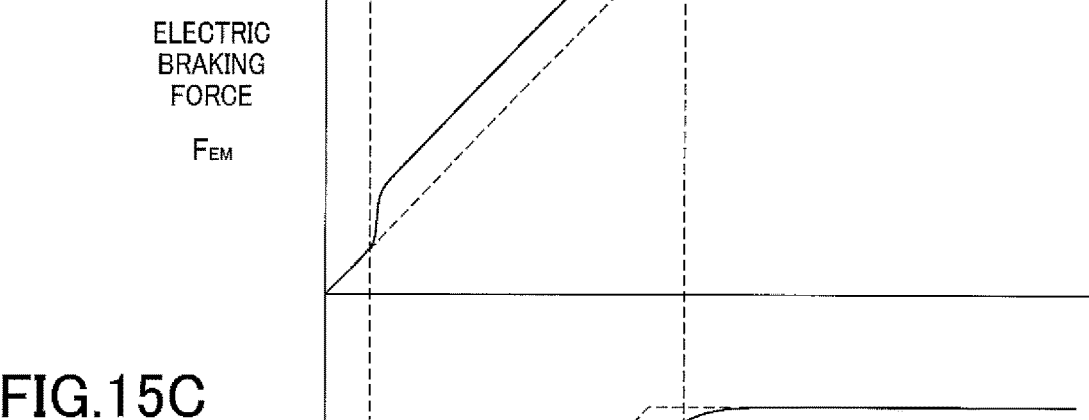
Figure 15C:
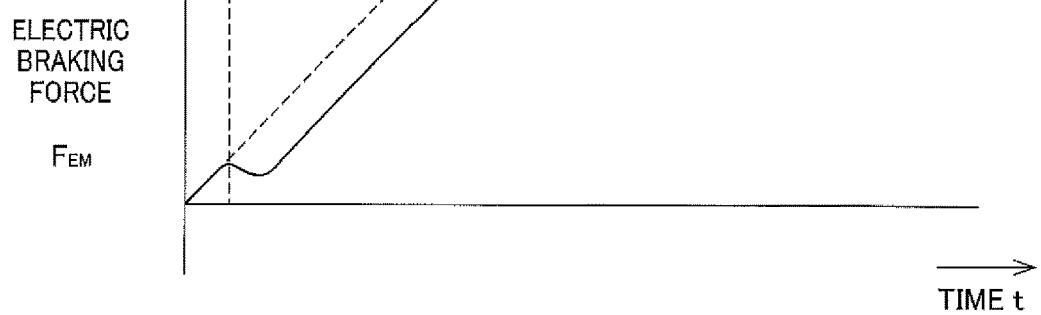
Figure 16A:
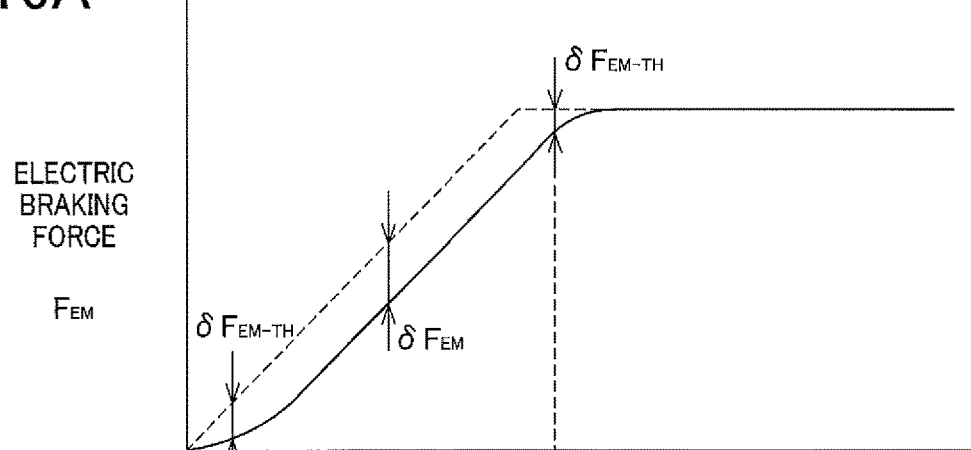
FIG. 16A is a graph showing a variation of the electric braking force that is detected and FIGS. 16B and 16C are graphs each showing that the hydraulic braking force is changed to cope with the detected variation.
Figure 16B:
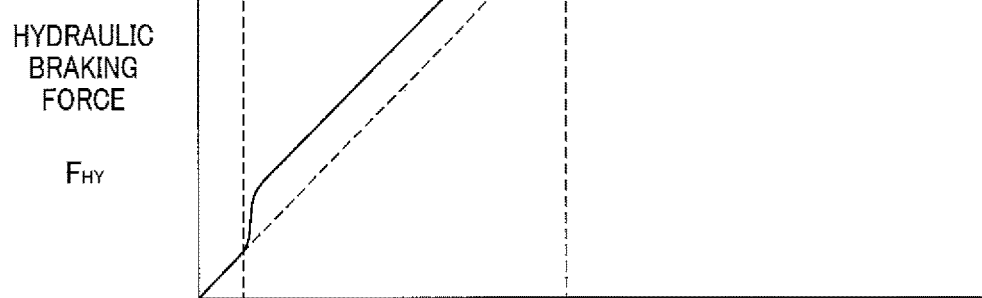
Figure 16C:
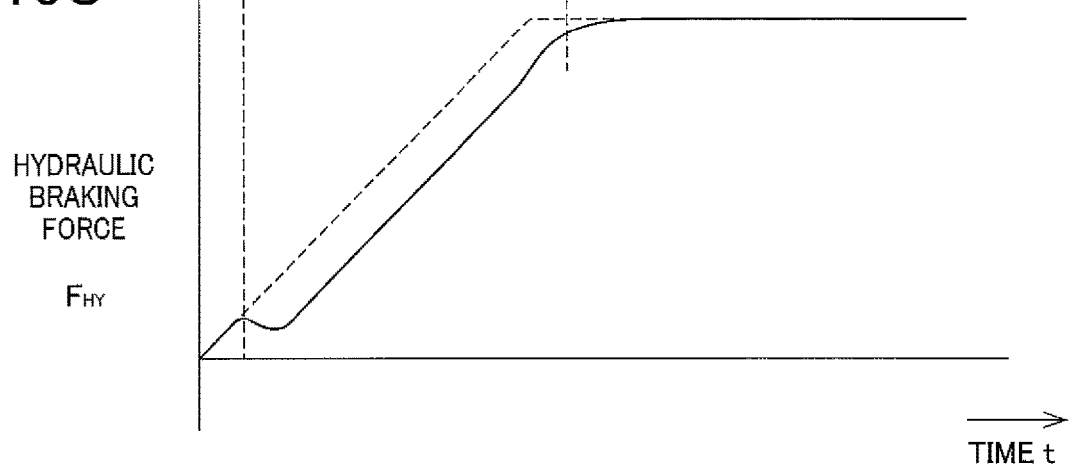

When the decrease of the hydraulic braking force $F_{HY}$ shown in FIG. 15A is identified according to the processing described above, the electric braking force $F_{EM}$ is increased as shown in FIG. 15B in the supplementing mode while the electric braking force $F_{EM}$ is decreased as shown in FIG. 15C in the balance mode. When the decease of the electric braking force $F_{EM}$ shown in FIG. 16A is identified according to the processing described above, the hydraulic braking force $F_{HY}$ is increased as shown in FIG. 16B in the supplementing mode while the hydraulic braking force $F_{HY}$ is decreased as shown in FIG. 16C in the balance mode.

iii) Control Flow

Figure 17:
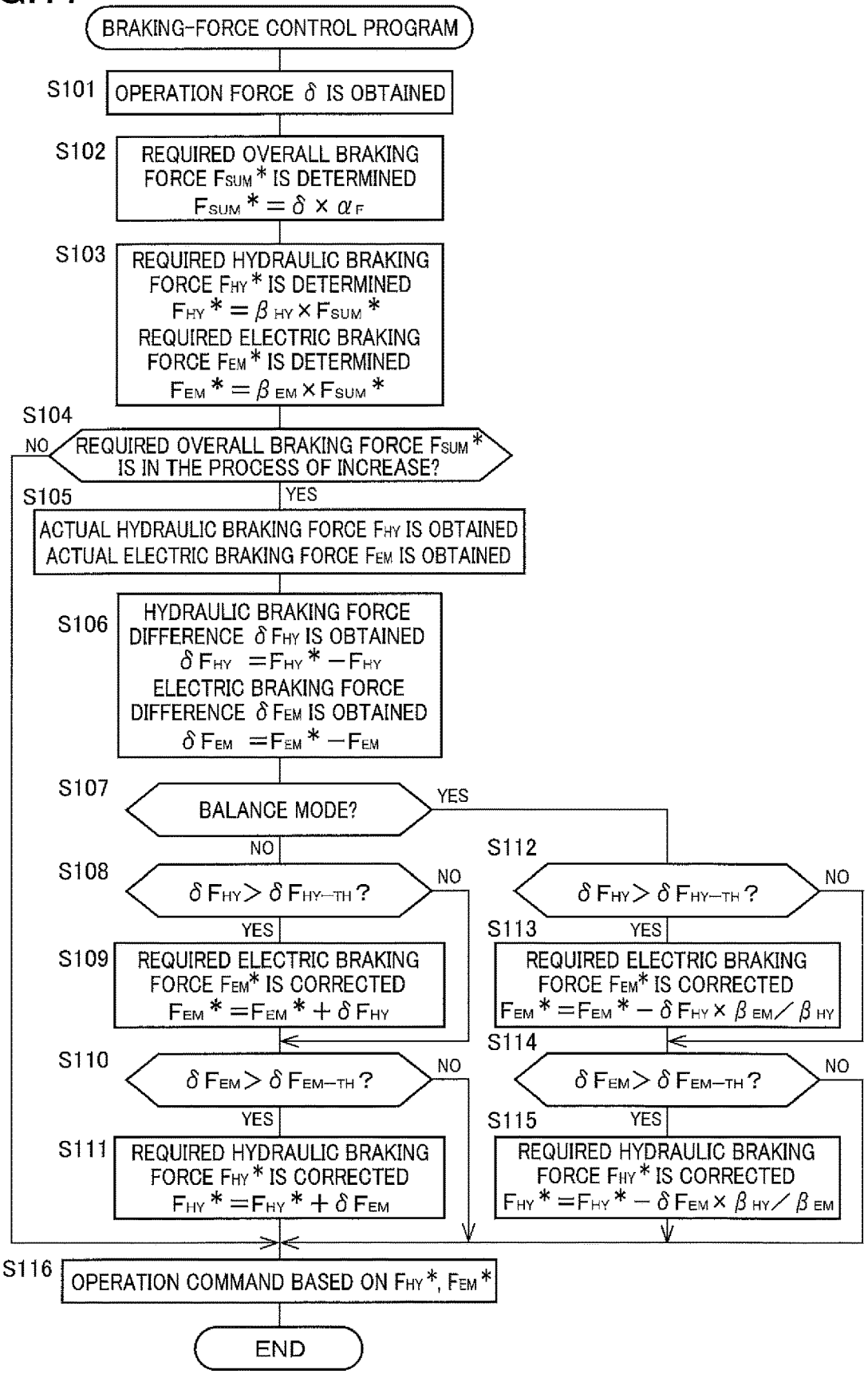
FIG. 17 is a flowchart showing a braking-force control program executed in the vehicle brake system of the second embodiment.

The control of the present vehicle brake system is executed such that the computer of the ECU 130 repeatedly executes a braking-force control program indicated by a flowchart of FIG. 17 at a short time pitch from several pees to several cosecs, for instance. The flow of control of the braking force in the present brake system will be hereinafter explained based on explanation of processing according to the control program. Portions of processing in the vehicle brake system of the second embodiment which are the same as those in the vehicle brake system of the first embodiment will be briefly explained.

In the processing according to the braking-force control program, the operation force δ is obtained at S101, and the required overall braking force $F_{SUM}{}^*$ is determined at S102 by multiplying the operation force δ by the braking force coefficient $α_F$. Subsequently, at S103, the required hydraulic braking force $F_{HY}{}^*$ is determined by multiplying the required overall braking force $F_{SUM}{}^*$ by the hydraulic braking force distribution coefficient $β_{HY}$, and the required electric braking force $F_{EM}{}^*$ is determined by multiplying the required overall braking force $F_{SUM}{}^*$ by the electric braking force distribution coefficient $β_{EM}$.

It is then determined at S104 whether or not the required overall braking force $F_{SUM}{}^*$ is in the process of increase based on the required overall braking force $F_{SUM}{}^*$ in previous execution of the program and the required overall braking force $F_{SUM}{}^*$ in current execution of the program. When the required overall braking force $F_{SUM}{}^*$ is in the process of increase, there are implemented S105 and its subsequent steps to cope with the decrease of the hydraulic braking force $F_{HY}$ and the decrease of the electric braking force $F_{EM}$.

At S105, the actual hydraulic braking force $F_{HY}$ is based on the wheel cylinder pressure $P_W$, and the actual electric braking force $F_{EM}$ is obtained based on the pushing load W of the brake pad 120. At S106, the obtained actual hydraulic braking force $F_{HY}$ is subtracted from the required hydraulic braking force $F_{HY}{}^*$, and the obtained actual electric braking force $F_{EM}$ is subtracted from the required electric braking force $F_{EM}{}^*$, whereby the hydraulic braking force difference $δF_{HY}$ and the electric braking force difference $δF_{EM}$ are obtained.

It is subsequently determined at S107 whether the mode for coping with the decrease of the hydraulic braking force $F_{HY}$ and the decrease of the electric braking force $F_{EM}$ is the supplementing mode or the balance mode. When the mode is the supplementing mode, S108 to S111 are implemented. When the mode is the balance mode, S112 to S115 are implemented.

In the supplementing mode, it is determined at S108 whether the hydraulic braking force difference $δF_{HY}$ is in excess of the threshold difference $δF_{HY\text{-}TH}$. When the hydraulic braking force difference $δF_{HY}$ is in excess of the threshold difference $δF_{HY\text{-}TH}$, the control flow goes to S109 to add the hydraulic braking force difference $δF_{HY}$ to the required electric braking force $F_{EM}{}^*$, whereby the required electric braking force $F_{EM}{}^*$ is corrected. It is determined at S110 whether the electric braking force difference $δF_{EM}$ is in excess of the threshold difference $δF_{EM\text{-}TH}$. When the electric braking force difference $δF_{EM}$ is in excess of the threshold difference $δF_{EM\text{-}TH}$, the control flow goes to S111 to add the electric braking force difference $δF_{EM}$ to the required hydraulic braking force $F_{HY}{}^*$, whereby the required hydraulic braking force $F_{HY}{}^*$ is corrected. In the balance mode, it is determined at S112 whether the hydraulic braking force difference $δF_{HY}$ is in excess of the threshold difference $δF_{HY\text{-}TH}$. When the hydraulic braking force difference $δF_{HY}$ is in excess of the threshold difference $δF_{HY\text{-}TH}$, the control flow goes to S113 in which a multiplication product of: the ratio $β_{EM}/β_{HY}$ (which is a ratio of the electric braking force distribution coefficient $β_{EM}$ to the hydraulic braking force distribution coefficient $β_{HY}$); and the hydraulic braking force difference $δF_{HY}$ is subtracted from the required electric braking force $F_{EM}{}^*$, whereby the required electric braking force $F_{EM}{}^*$ is corrected. It is determined at S114 whether the electric braking force difference $δF_{EM}$ is in excess of the threshold difference $δF_{EM\text{-}TH}$. When the electric braking force difference $δF_{EM}$ is in excess of the threshold difference $δF_{EM\text{-}TH}$, the control flow goes to S115 in which a multiplication product of: the ratio $β_{HY}/β_{EM}$ (which is a ratio of the hydraulic braking force distribution coefficient $β_{HY}$ to the electric braking force distribution coefficient $β_{EM}$); and the electric braking force difference $δF_{EM}$ is subtracted from the required hydraulic braking force $F_{HY}{}^*$, whereby the required hydraulic braking force $F_{HY}{}^*$ is corrected.

At S116, an operation command based on the thus determined and corrected required hydraulic braking force $F_{HY}{}^*$ and required electric braking force $F_{EM}{}^*$ is issued to the hydraulic brake device 32 and the electric brake device 34. Thus, a series of processing according to the program ends.

Embodiment 3

A. Outline of Vehicle Drive System and Vehicle Brake System

Figure 18:
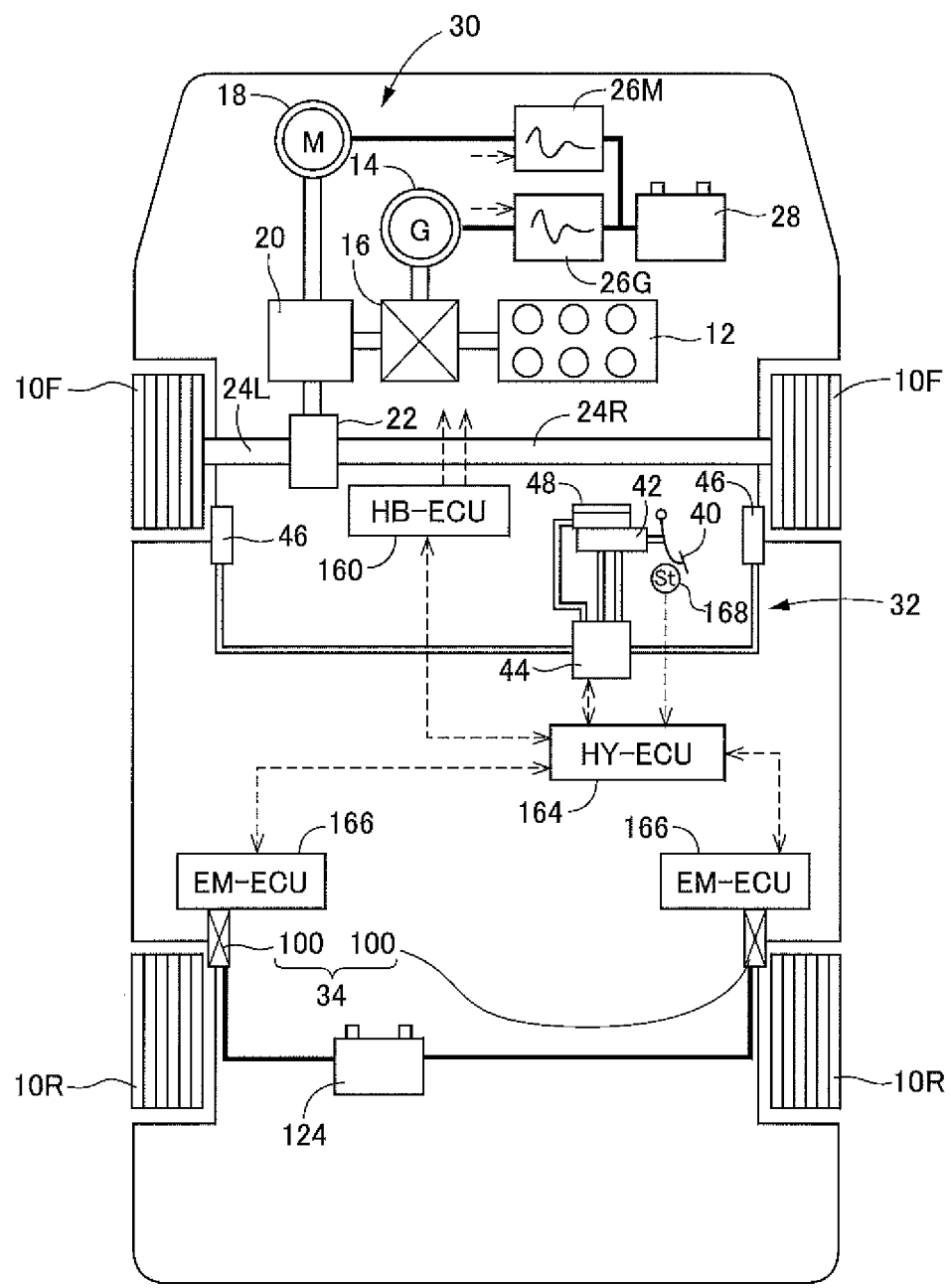
FIG. 18 is a view conceptually showing an overall structure of a vehicle brake system according to a third embodiment.

As schematically shown in FIG. 18, a vehicle on which a vehicle brake system according to a third embodiment is installed (hereinafter referred to as "the vehicle of the third embodiment" where appropriate) is a hybrid vehicle like the vehicle on which the vehicle brake system according to the first embodiment is installed (hereinafter referred to as "the vehicle of the first embodiment"). A vehicle drive system according to the third embodiment is substantially similar to the vehicle drive system of the first embodiment. In the following explanation, the same reference numerals as used in the first embodiment are used to identify constituent components of the third embodiment having the same functions as the constituent components of the first embodiment, and a detailed explanation thereof is dispensed with. Unlike the control in the vehicle drive system installed on the vehicle of the first embodiment, the control in the vehicle drive system installed on the vehicle of the third embodiment is executed by an exclusive hybrid electronic control unit 160 (hereinafter referred to as "HB-ECU" where appropriate). Specifically, the NB-ECU 160 includes a computer and drive circuits (drivers) for components of the vehicle drive system to be controlled. The HB-ECU 160 manages the charged amount of the battery 28 and controls the inverter 26M, the inverter 26G, for instance.

As schematically shown in FIG. 18, the vehicle brake system of the present embodiment includes (a) the regenerative brake device 30 configured to give the braking force to each of the two front wheels 10F, (b) the hydraulic brake device 32 configured to give the braking force to each of the two front wheels 10F, independently of the braking force given by the regenerative brake device 30, and (c) the electric brake device 34 configured to give the braking force to each of the two rear wheels 10R. That is, in contrast to the vehicle brake system of the first embodiment in which the hydraulic brake device 32 is provided for the rear wheels 10R and the electric brake device 34 is provided for the front wheels 10F, the hydraulic brake device 32 is provided for the front wheels 10F and the electric brake device 34 is provided for the rear wheels 10R in the vehicle brake system of the third embodiment, as in the vehicle brake system of the second embodiment.

B. Regenerative Brake Device

The regenerative brake device 30 of the vehicle brake system of the present embodiment is substantially similar in construction to the regenerative brake device 30 of the vehicle brake system of the first embodiment. The regenerative braking force, however, is controlled by the HB-ECU 160.

C. Hydraulic Brake Device

Figure 19:
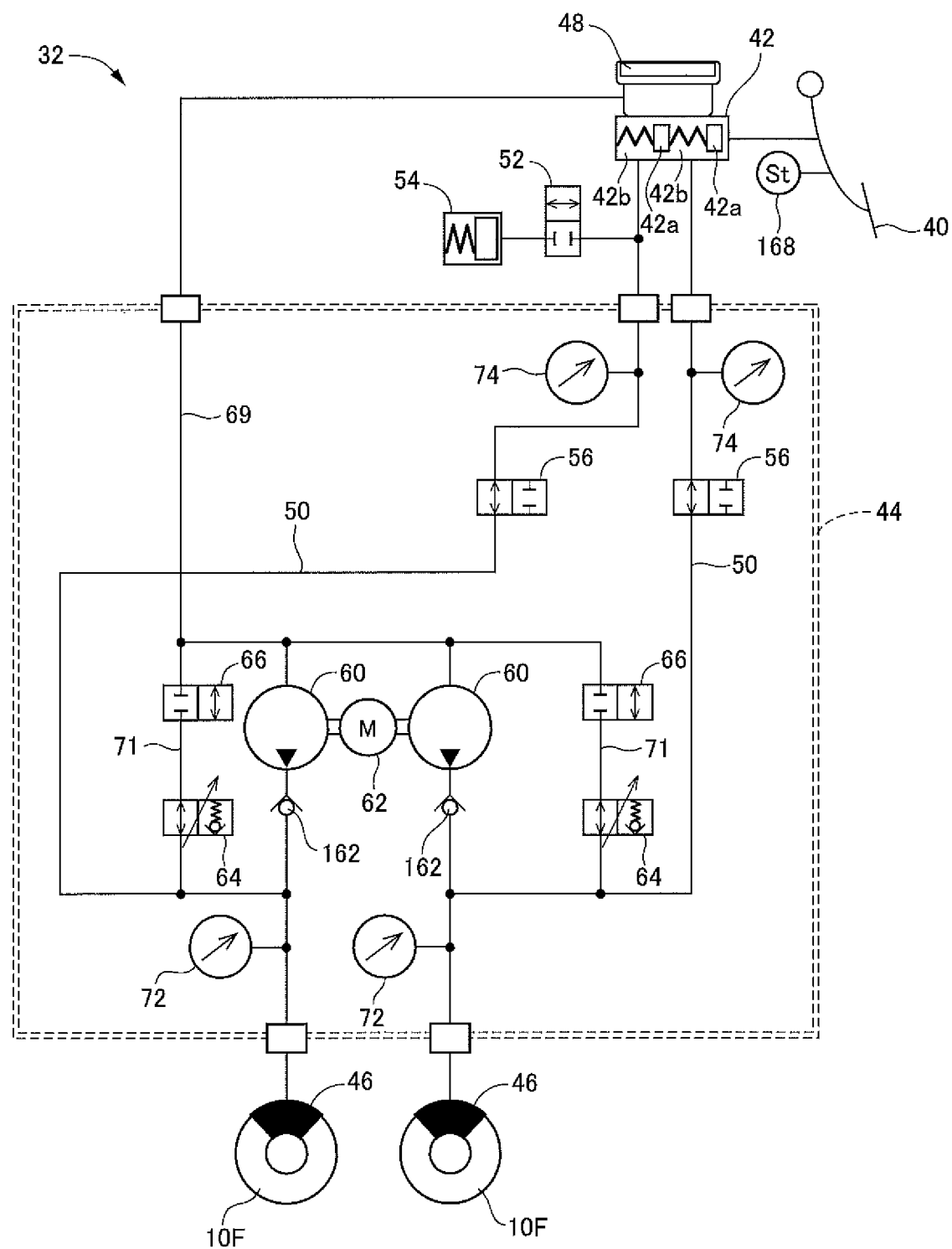
FIG. 19 is a hydraulic circuit diagram of a hydraulic brake device of the vehicle brake system shown in FIG. 18.

The hydraulic brake device 32 of the vehicle brake system of the present embodiment (hereinafter referred to as "the hydraulic brake device 32 of the present embodiment) is substantially similar in construction and function to the hydraulic brake device 32 of the vehicle brake system of the first embodiment (hereinafter referred to as "the hydraulic brake device 32 of the first embodiment"), except for the wheels to which the hydraulic braking force is given. The actuator unit 44 is slightly different between the hydraulic brake device 32 of the present embodiment and the hydraulic brake device 32 of the first embodiment. Specifically, as shown in FIG. 19, check valves 162 are provided in the actuator unit 44 of the hydraulic brake device 32 of the present embodiment, in place of the buffers 70 provided in the actuator unit 44 (FIG. 2) of the hydraulic brake device 32 of the first embodiment. Further, the check valves 68 provided in the actuator unit 44 of the hydraulic brake device 32 of the first embodiment are omitted in the actuator unit 44 of the hydraulic brake device 32 of the present embodiment. It is possible, also in the vehicle brake system of the present embodiment, to enjoy the advantage of a reduction in the size of the hydraulic brake device.

D. Electric Brake Device

The electric brake device 34 of the vehicle brake system of the present embodiment is substantially similar in construction and function to the electric brake device 34 of the vehicle brake system of the first embodiment, except for the wheels to which the electric braking force is given.

E. Control of Vehicle Brake System i) Control System

Control of the vehicle brake system of the present embodiment, namely, control of the braking force F, is executed by a control system shown in FIG. 18. Specifically, the hydraulic brake device 32 is controlled by an electronic control unit 164 for the hydraulic brake device (hereinafter referred to as "HY-ECU"). The electric brake device 34 is controlled by electronic control units 166 provided for the respective wheel brakes 100 (hereinafter referred to as "EM-ECU"). The HY-ECU 164 includes a computer and drivers (drive circuits) for components of the hydraulic brake device 32. The EM-ECU 166 includes a computer and drivers (drive circuits) for components of the electric brake device 34. As explained above, the regenerative brake device 30 is controlled by the HB-ECU 160.

Specifically, the HB-ECU 160 controls the inverters 26G, 26M that constitute the regenerative brake device 30, the HY-ECU 164 controls the pressure holding valves 64 of the actuator unit 44 that constitutes the hydraulic brake device 32, and the EM-ECUs 166 respectively control the electric motors 114 of the corresponding wheel brakes 100 that constitute the electric brake device 34, thereby controlling the regenerative braking force $F_{RG}$, the hydraulic braking force $F_{HY}$, and the electric braking force $F_{EM}$. Consequently, an overall braking force $F_{SUM}$, which is the braking force F to be given to the vehicle as a whole, is controlled. In the vehicle brake system, the HB-ECU 160, the HY-ECU 164, and the EM-ECUs 166 are connected to one another by a network in the vehicle (CAN) and execute the respective controls while performing communication with one another. As later explained, the HY-ECU 164 functions, in the present vehicle brake system, as a main electronic control unit that also controls the HB-ECU 160 and the EM-ECUs 166. It may be considered that one controller is constituted by the HB-ECU 160, the HY-ECU 164, and the EM-ECUs 166.

ii) Basic Control of Braking Force

Figure 20:
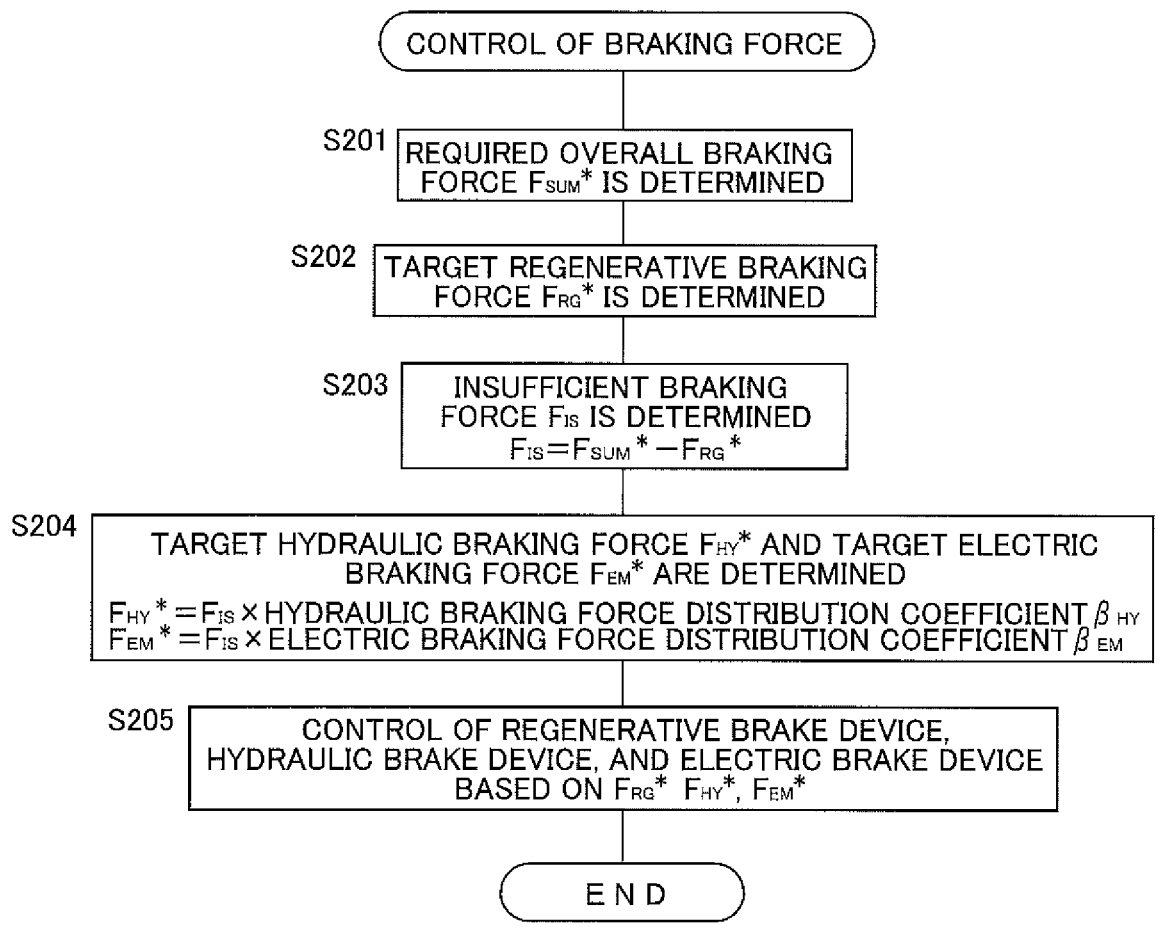
FIG. 20 is a flow chart conceptually showing control of braking forces in the vehicle brake system of the third embodiment.

Basic control of the braking force in the present vehicle brake system is executed conceptually as shown in a flowchart of FIG. 20. The basic control of the braking force will be hereinafter explained based on the flowchart. Processing based on the flowchart is repeatedly executed at a short time pitch, e.g., about several msecs.

There is initially determined, at Step 201, a required overall braking force $F_{SUM}{}^*$ which is a braking force F required for the vehicle as a whole, i.e., a sum of the braking forces F to be given to the four wheels 10, based on an operation of the brake pedal 40. (Hereinafter, Step 201 is abbreviated as "S201" and other steps are similarly abbreviated.) Specifically, the brake pedal 40 is provided with an operation stroke sensor 168 for detecting an operation stroke St as an operation amount of the brake pedal 40, as shown in FIGS. 18 and 19. The HY-ECU 164 obtains the required overall braking force $F_{SUM}{}^*$ by multiplying the operation stroke St detected by the operation stroke sensor 168 by a braking force coefficient $\alpha_F$. The operation stroke St is one example of an operation value indicative of a degree of the operation of the brake pedal 40, namely, indicative of a degree of the brake operation, and may be considered as a parameter indicative of the required overall braking force $F_{SUM}{}^*$.

In the present vehicle brake system, the regenerative braking force $F_{RG}$ is preferentially generated, and the hydraulic braking force $F_{HY}$ and the electric braking force $F_{EM}$ cover a shortage in the required overall braking force $F_{SUM}{}^*$ that cannot be covered by the regenerative braking force $F_{RG}$. The shortage will be referred to as "insufficient braking force $F_{IS}$".

To attain the above, a signal relating to the required overall braking force $F_{SUM}{}^*$ is transmitted from the HY-ECU 164 to the HB-ECU 160. At S202, the HB-ECU 160 determines a required regenerative braking force (target regenerative braking force) $F_{RG}{}^*$ as a maximum regenerative braking force $F_{RG}$ that can be generated within a range not exceeding the required overall braking force $F_{SUM}{}^*$. A signal relating to the required regenerative braking force $F_{RG}{}^*$ is returned from the HB-ECU 160 to the HY-ECU 164.

At S203, the HY-ECU 164 determines the insufficient braking force $F_{IS}$ by subtracting the required regenerative braking force $F_{RG}{}^*$ from the required overall braking force $F_{SUM}{}^*$. The insufficient braking force $F_{IS}$ is covered by the hydraulic braking force $F_{HY}$ and the electric braking force $F_{EM}$ such that the hydraulic braking force $F_{HY}$ and the electric braking force $F_{EM}$ satisfy a set distribution ratio ($\beta_{HY}:\beta_{EM}$). Specifically, at S204, the HY-ECU 164 respectively multiplies the insufficient braking force $F_{IS}$ by a hydraulic braking force distribution coefficient $\beta_{HY}$ and an electric braking force distribution coefficient $\beta_{EM}$ ($\beta_{HY}$+ $\beta_{EM}$=1), so as to determine a required hydraulic braking force (target hydraulic braking force) $F_{HY}^*$ as the hydraulic braking force $F_{HY}$ to be generated and a required electric braking force (target electric braking force) $F_{EM}^*$ as the electric braking force $F_{EM}$ be generated. A signal relating to the target electric braking force $F_{EM}^*$ is transmitted from the HY-ECU 164 to the EM-ECUs 166.

At S205, the regenerative brake device 30, the hydraulic brake device 32, and the electric brake device 34 are controlled respectively based on the required regenerative braking force $F_{RG}^*$, the required hydraulic braking force $F_{HY}^*$, and the required electric braking force $F_{EM}^*$ determined as described above. Specifically, the 11B-ECU 160 controls the inverter 26M such that the regenerative braking force $F_{RG}$ becomes equal to the required regenerative braking force $F_{RG}^*$. The HY-ECU 164 controls the electric currents to be supplied to the motor 62 and the pressure holding valves 64 such that the hydraulic braking force $F_{HY}$ becomes equal to the required hydraulic braking force $F_{HY}^*$. The EM-ECUs 166 control the electric current to be supplied to the electric motors 114 such that the electric braking force $F_{EM}$ becomes equal to the required electric braking force $F_{EM}^*$.

According to the control described above, the regenerative braking force, the hydraulic braking force, and the electric braking force are controlled so as to cooperate with one another. Specifically, the regenerative braking force, the hydraulic braking force, and the electric braking force are cooperatively controlled such that the hydraulic braking force and the electric braking force cover the shortage in the required overall braking force that cannot be covered by the regenerative braking force, i.e., the insufficient braking force. The cooperative control enables an appropriate required overall braking force to be easily obtained even if the regenerative braking force varies due to a variation in the vehicle running speed or a variation in the state of charge (SOC) of the battery 28, for instance. Further, the hydraulic braking force and the electric braking force are cooperatively controlled such that the hydraulic braking force and the electric braking force are generated at the set distribution ratio ($\beta_{HY}:\beta_{EM}$). The cooperative control enables the two braking forces to be controlled according to a simple control rule, whereby an appropriate braking force required for the vehicle as a whole can be easily controlled.

Modifications

In the vehicle brake system of the first embodiment, the electric braking force is given to one of the front wheel 10F and the rear wheel 10R to which the regenerative braking force is given, and the hydraulic braking force is given to the other of the front wheel 10F and the rear wheel 10F to which the regenerative braking force is not given. In the vehicle brake system of the third embodiment, the electric braking force is given to one of the front wheel 10F and the rear wheel 10R to which the regenerative braking force is not given, and the hydraulic braking force is given to the other of the front wheel 10F and the rear wheel 10R to which the regenerative braking force is given. In an instance where the vehicle brake system includes the regenerative brake device, determination about which one of the hydraulic braking force and the electric braking force is applied to the wheel to which the regenerative braking force is given may be determined in accordance with the overall design concept of the vehicle brake system. The brake system of the first embodiment is installed on the front-wheel drive vehicle. The brake system may be installed on rear-wheel drive vehicles or four-wheel drive vehicles. In the vehicle brake system of the first embodiment, when the vehicle running speed becomes lower than the threshold speed as a result of deceleration of the vehicle, the switching operation is performed in which the regenerative braking force is gradually decreased, and the hydraulic braking force is gradually increased. The switching operation may be modified such that the electric braking force is gradually increased with a gradual decrease of the regenerative braking force.

In the vehicle brake system of the second embodiment, the hydraulic braking force is given to the drive wheel, and the electric braking force is given to the non-drive wheel. The electric braking force may be given to the drive wheel, and the hydraulic braking force may be given to the non-drive wheel. The brake system of each of the first through third embodiments is installed on the front-wheel drive vehicle. The brake system of each of the first through third embodiments may be installed on rear-wheel drive vehicles or four-wheel drive vehicles. In the vehicle brake system of each of the first embodiment and the third embodiment, the regenerative brake device is provided for the front wheels 10F. It is possible to construct a vehicle brake system in which the regenerative brake device is provided for the rear wheels 10R.

In terms of identification of the variation of one of the hydraulic braking force and the electric braking force, the concept of the braking-force control of the vehicle brake system of the second embodiment may be employed in the vehicle brake system of the first embodiment. In other words, the brake system equipped with the regenerative brake device may be configured to: identify the variation of one of the hydraulic braking force and the electric braking force based on detection of the actual braking force; and change the other of the hydraulic braking force and the electric braking force. In this instance, S104 to S115 in the braking-force control program (FIG. 17) executed in the vehicle brake system of the second embodiment is replaced with S7 to S13 in the braking-force control program (FIG. 10) executed in the vehicle brake system the first embodiment.

Similarly, the concept of the braking-force control of the vehicle brake system of the first embodiment may be employed in the vehicle brake system of the second embodiment. In other words, the brake system not equipped with the regenerative brake device may be configured to: estimate that the vehicle is in a situation in which one of the hydraulic braking force and the electric braking force decreases based on at least one of the environment in which the vehicle is placed and the condition of the constituent component of the vehicle brake system; and change the other of the hydraulic braking force and the electric braking force based on the estimation. In this instance, the braking-force control program (FIG. 10) executed in the vehicle brake system of the first embodiment is executed such that the required regenerative braking force $F_{RG}^*$ is treated as being equal to 0.

In the vehicle brake system of the first embodiment, the switching operation is performed in which the hydraulic braking force is increased while the regenerative braking force is decreased. The switching operation may be modified such that the electric braking force is increased while the regenerative braking force is decreased.

In the vehicle brake system of each of the first embodiment and the second embodiment, the brake device configured to electronically control the hydraulic braking force is employed as the hydraulic brake device. A hydraulic brake device configured not to electronically control the hydraulic braking force, such as a hydraulic brake device equipped with a negative-pressure booster, may be employed. In this instance, though the variation of the electric braking force cannot be coped with by changing the hydraulic braking force, the variation of the hydraulic braking force can be coped with by changing the electric braking force.

Only one ECU 130 may control the respective braking forces F as in the brake system of the first embodiment. Alternatively, a plurality of ECUs may respectively control a plurality of braking forces F while performing communication with one another, as in the brake system of the third embodiment.

In the brake system of each of the illustrated embodiments, the electric current is supplied from the auxiliary battery 124 to each of the wheel brakes 100 that constitute the electric brake device 34. The electric current may be supplied from the battery 28 of the vehicle drive system.

As one example of the operation value indicative of the degree of the operation of the brake pedal 40 (which is the brake operation member), namely, indicative of the degree of the brake operation, the brake operation force δ is used in the vehicle brake system of the first embodiment and the operation stroke St is used in the vehicle brake system of the third embodiment. The operation value may be considered as a parameter indicative of the required overall braking force. Either of the brake operation force δ and the operation stroke St may be used as the operation value in the vehicle brake systems of the first and third embodiments. Alternatively, both of the brake operation force δ and the operation stroke St may be used for determining the required overall braking force.

What is claimed is:

1. A vehicle brake system, comprising:
   a brake operation member to be operated by a driver of a vehicle;
   a hydraulic brake device provided for one of a front wheel and a rear wheel and configured to generate a hydraulic braking force in accordance with an operation of the brake operation member, the hydraulic braking force depending on a pressure of a working fluid; and
   an electric brake device provided for the other of the front wheel and the rear wheel and configured to generate an electric braking force in accordance with the operation of the brake operation member, the electric braking force depending on a motion of an electric motor,
   wherein:
      the vehicle brake system is configured to perform at least one of the following:
         (i) estimate an amount of decrease of the hydraulic braking force when an outside temperature detected by an outside temperature sensor is lower than a threshold temperature, the estimate being performed based on the detected outside temperature and a predetermined relationship between the outside temperature and the hydraulic braking force;
         (ii) estimate an amount of decrease of the hydraulic braking force when an atmospheric pressure detected by an atmospheric pressure sensor is lower than a threshold atmospheric pressure, the estimate being performed based on the detected atmospheric pressure and a predetermined relationship between the atmospheric pressure and the hydraulic braking force; and
         (iii) estimate an amount of decrease of the electric braking force when a temperature of the electric motor detected by a motor temperature sensor is higher than a threshold motor temperature, the estimate being performed based on the detected temperature of the electric motor and a predetermined relationship between the temperature of the electric motor and the electric braking force;
      the vehicle brake system is configured to be operated in one of a supplementing mode and a balance mode; and
      based on at least one of the estimated amounts of decrease of the hydraulic braking force and the estimated amount of decrease of the electric braking force, the vehicle brake system is configured to:
         in the supplementing mode, increase one of the hydraulic braking force and the electric braking force to compensate for the decrease of the other of the hydraulic braking force and the electric braking force, or
         in the balance mode, decrease the one of the hydraulic braking force and the electric braking force in accordance with the decrease of the other of the hydraulic braking force and the electric braking force.

2. The vehicle brake system according to claim 1, wherein the hydraulic brake device includes:
   a rotation body configured to rotate together with the one of the front wheel and the rear wheel;
   a friction member configured to be pressed onto the rotation body;
   a wheel cylinder configured to operate by the working fluid supplied thereto for pressing the friction member onto the rotation body;
   a pump configured to pressurize the working fluid and to supply the pressurized working fluid to the wheel cylinder; and
   a pressure holding valve configured to controllably hold the pressure of the working fluid to be supplied to the wheel cylinder.

3. The vehicle brake system according to claim 2,
   wherein the hydraulic brake device further includes:
      a master cylinder including (a) a piston coupled to the brake operation member and (b) a pressurizing chamber in which the working fluid introduced thereinto is pressurized by a movement of the piston, the master cylinder being configured to pressurize the working fluid by an operation force applied by the driver to the brake operation member;
      a master fluid passage through which the working fluid pressurized in the pressurizing chamber of the master cylinder is supplied to the wheel cylinder; and
      an open/close valve configured to open and close the master fluid passage,
   wherein an operation of the wheel cylinder by the working fluid supplied from the master cylinder and an operation of the wheel cylinder by the working fluid supplied from the pump are selectively established based on an operation state of the open/close valve.

4. The vehicle brake system according to claim 3,
   wherein the hydraulic brake device includes: a reservoir which stores the working fluid and from which the pump pumps up the working fluid; and a reservoir fluid passage which connects the reservoir and the pump, and
   wherein the pressure holding valve allows a part of the working fluid that is to be supplied from the pump to the wheel cylinder to pass through the pressure holding valve so as to control the pressure of the working fluid, and the part of the working fluid which has passed through the pressure holding valve flows into the reservoir or the reservoir fluid passage.

5. The vehicle brake system according to claim 4, wherein the hydraulic brake device includes a cut-off valve configured to cut a flow of the working fluid into the reservoir or the reservoir fluid passage when the wheel cylinder is operated by the working fluid supplied from the master cylinder in a state in which the open/close valve is opened.

6. The vehicle brake system according to claim 4, wherein the reservoir is disposed near the master cylinder, and the working fluid from the reservoir is pressurized in the pressurizing chamber of the master cylinder.

7. The vehicle brake system according to claim 3, wherein the hydraulic brake device includes a stroke simulator provided on the master fluid passage and configured to allow the operation of the brake operation member while giving, to the brake operation member, a counterforce in accordance with the operation of the brake operation member when the wheel cylinder is operated by the working fluid supplied from the pump in a state in which the open/close valve is closed.

8. The vehicle brake system according to claim 2, wherein the pump and the pressure holding valve of the hydraulic brake device are incorporated in an actuator unit.

9. The vehicle brake system according to claim 2, wherein the pressure holding valve is an electromagnetic linear valve configured to decrease the pressure of the working fluid to be supplied to the wheel cylinder to a pressure in accordance with an electric current supplied to the electromagnetic linear valve.

10. The vehicle brake system according to claim 1, further comprising a regenerative brake device provided for one of the front wheel and the rear wheel for which one of the hydraulic brake device and the electric brake device is provided, the regenerative brake device being configured to generate a regenerative braking force utilizing electric power generation by rotation of the one of the front wheel and the rear wheel,
wherein the hydraulic braking force, the electric braking force, and the regenerative braking force are controlled so as to cooperate with one another.

11. The vehicle brake system according to claim 10, wherein the hydraulic braking force and the electric braking force are controlled such that the hydraulic braking force and the electric braking force cover an insufficient braking force that cannot be covered by the regenerative braking force, the insufficient braking force being a shortage in a required overall braking force that is a braking force required for the vehicle as a whole.

12. The vehicle brake system according to claim 1, wherein the hydraulic braking force and the electric braking force are generated at a set distribution ratio.

13. The vehicle brake system according to claim 1, wherein the vehicle brake system is further configured to change the one of the hydraulic braking force and the electric braking force when the other of the hydraulic braking force and the electric braking force decreases due to a delay of increasing of the one of the hydraulic braking force and the electric braking force.

14. The vehicle brake system according to claim 1, further comprising a regenerative brake device provided for one of the front wheel and the rear wheel for which one of the hydraulic brake device configured to generate the hydraulic braking force and the electric brake device configured to generate the electric braking force is provided, the regenerative brake device being configured to generate a regenerative braking force utilizing electric power generation by rotation of the one of the front wheel and the rear wheel for which the regenerative brake device is provided,
wherein, when a switching operation is performed for increasing the other of the hydraulic braking force and the electric braking force while decreasing the regenerative braking force, the vehicle brake system is configured to increase or decrease the one of the hydraulic braking force and the electric braking force so as to correspond to the decrease of the other of the hydraulic braking force and the electric braking force in the situation in which the other of the hydraulic braking force and the electric braking force decreases.

15. A vehicle brake system, comprising:
a brake operation member to be operated by a driver of a vehicle;
a hydraulic brake device provided for one of a front wheel and a rear wheel and configured to generate a hydraulic braking force in accordance with an operation of the brake operation member, the hydraulic braking force depending on a pressure of a working fluid; and
an electric brake device provided for the other of the front wheel and the rear wheel and configured to generate an electric braking force in accordance with the operation of the brake operation member, the electric braking force depending on a motion of an electric motor,
wherein:
the vehicle brake system is configured to perform at least one of the following:
(i) estimate an amount of decrease of the hydraulic braking force when an outside temperature detected by an outside temperature sensor is lower than a threshold temperature, the estimate being performed based on the detected outside temperature and a predetermined relationship between the outside temperature and the hydraulic braking force;
(ii) estimate an amount of decrease of the hydraulic braking force when an atmospheric pressure detected by an atmospheric pressure sensor is lower than a threshold atmospheric pressure, the estimate being performed based on the detected atmospheric pressure and a predetermined relationship between the atmospheric pressure and the hydraulic braking force; and
(iii) estimate an amount of decrease of the electric braking force when a temperature of the electric motor detected by a motor temperature sensor is higher than a threshold motor temperature, the estimate being performed based on the detected temperature of the electric motor and a predetermined relationship between the temperature of the electric motor and the electric braking force; and
based on at least one of the estimated amounts of decrease of the hydraulic braking force and the estimated amount of decrease of the electric braking force, the vehicle brake system is configured to:
increase one of the hydraulic braking force and the electric braking force to compensate for the decrease of the other of the hydraulic braking force and the electric braking force, or
decrease the one of the hydraulic braking force and the electric braking force in accordance with the decrease of the other of the hydraulic braking force and the electric braking force, wherein the hydraulic brake device includes:
  a rotation body configured to rotate together with the one of the front wheel and the rear wheel;
  a friction member configured to be pressed onto the rotation body;
  a wheel cylinder configured to operate by the working fluid supplied thereto for pressing the friction member onto the rotation body;
  a pump configured to pressurize the working fluid and to supply the pressurized working fluid to the wheel cylinder;
a pressure holding valve configured to controllably hold the pressure of the working fluid to be supplied to the wheel cylinder;
  a master cylinder including (a) a piston coupled to the brake operation member and (b) a pressurizing chamber in which the working fluid introduced thereinto is pressurized by a movement of the piston, the master cylinder being configured to pressurize the working fluid by an operation force applied by the driver to the brake operation member;
  a master fluid passage through which the working fluid pressurized in the pressurizing chamber of the master cylinder is supplied to the wheel cylinder;
  an open/close valve configured to open and close the master fluid passage; and
  a cut-off valve configured to cut a flow of the working fluid into the reservoir or the reservoir fluid passage when the wheel cylinder is operated by the working fluid supplied from the master cylinder in a state in which the open/close valve is opened,
wherein an operation of the wheel cylinder by the working fluid supplied from the master cylinder and an operation of the wheel cylinder by the working fluid supplied from the pump are selectively established based on an operation state of the open/close valve.

* * * * *